(12) United States Patent
Zug et al.

(10) Patent No.: US 11,841,031 B2
(45) Date of Patent: Dec. 12, 2023

(54) COMPRESSOR SENSOR MOUNT

(71) Applicant: Honeywell International Inc., Charlotte, NC (US)

(72) Inventors: Andrew Zug, Costa Mesa, CA (US); Amanda Webb, San Pedro, CA (US); Michael Leighty, Westminster, CA (US)

(73) Assignee: Honeywell International Inc., Charlotte, NC (US)

( * ) Notice: Subject to any disclaimer, the term of this patent is extended or adjusted under 35 U.S.C. 154(b) by 275 days.

(21) Appl. No.: 17/249,416

(22) Filed: Mar. 2, 2021

(65) Prior Publication Data

US 2021/0285463 A1    Sep. 16, 2021

Related U.S. Application Data

(60) Provisional application No. 63/002,806, filed on Mar. 31, 2020, provisional application No. 62/989,455, filed on Mar. 13, 2020.

(51) Int. Cl.
*F25B 49/02* (2006.01)
*F04D 29/42* (2006.01)
(Continued)

(52) U.S. Cl.
CPC ......... *F04D 29/4213* (2013.01); *F04D 27/00* (2013.01); *F04D 29/083* (2013.01);
(Continued)

(58) Field of Classification Search
CPC ...................... F25B 49/02; F25B 41/31; F25B 2700/21151; F25B 2600/2513;
(Continued)

(56) References Cited

U.S. PATENT DOCUMENTS

| 3,635,579 A | 1/1972 | Wood |
| 5,123,811 A | 6/1992 | Kuroiwa |

(Continued)

FOREIGN PATENT DOCUMENTS

| CN | 106438362 A | 2/2017 |
| CN | 206257044 U | 6/2017 |

(Continued)

OTHER PUBLICATIONS

Ikeda, Oil Sensor and Refrigerator Compressor, 2020, Full Document (Year: 2020).*

(Continued)

*Primary Examiner* — Nael N Babaa
(74) *Attorney, Agent, or Firm* — Shumaker & Sieffert, P.A.

(57) ABSTRACT

The disclosed technology generally relates to a compressor housing that includes a main housing portion and an end housing portion. The main housing portion is configured to house a compressor motor and an inlet housing. The inlet housing is configured to receive vapor refrigerant downstream of the compressor motor. The main housing portion and the end housing portion are configured to interface at a mating surface of the respective housing portions and define a volume. The end housing portion includes a sensor cavity extending into the volume toward an opening of the inlet housing.

14 Claims, 19 Drawing Sheets

(51) Int. Cl.
  *F25B 41/31* (2021.01)
  *F04D 27/00* (2006.01)
  *F04D 29/08* (2006.01)
  *F04D 29/44* (2006.01)

(52) U.S. Cl.
  CPC ............ *F04D 29/441* (2013.01); *F25B 41/31* (2021.01); *F25B 49/02* (2013.01); *F25B 2400/07* (2013.01); *F25B 2600/2513* (2013.01); *F25B 2700/21151* (2013.01)

(58) Field of Classification Search
  CPC ............... F25B 2400/07; F04D 29/441; F04D 29/4213; F04D 29/083; F04D 27/00
  See application file for complete search history.

(56) References Cited

U.S. PATENT DOCUMENTS

| | | | |
|---|---|---|---|
| 5,857,348 | A | 1/1999 | Conry |
| 5,863,191 | A | 1/1999 | Motegi et al. |
| 6,461,120 | B2 | 10/2002 | Harakawa et al. |
| 6,807,821 | B2 | 10/2004 | Narney, II |
| 6,958,126 | B2 | 10/2005 | Goble |
| 7,025,577 | B2 | 4/2006 | Ioi et al. |
| 7,413,422 | B2 | 8/2008 | Ito |
| 8,424,327 | B2 | 4/2013 | Nishide et al. |
| 8,899,947 | B2 | 12/2014 | Lee et al. |
| 8,931,304 | B2 | 1/2015 | Beers et al. |
| 9,470,238 | B2 | 10/2016 | Vande Sande et al. |
| 10,612,823 | B2 | 4/2020 | Moreaux |
| 10,648,702 | B2 | 5/2020 | Verma et al. |
| 2009/0044548 | A1 | 2/2009 | Masoudipour et al. |
| 2014/0069139 | A1 | 3/2014 | Perevozchikov et al. |
| 2016/0190899 | A1 | 6/2016 | Terazawa et al. |
| 2016/0252093 | A1* | 9/2016 | Brostrom ............. F04C 29/021 418/1 |
| 2017/0146271 | A1 | 5/2017 | Hasegawa et al. |
| 2018/0038380 | A1 | 2/2018 | Morgan et al. |
| 2018/0231006 | A1 | 8/2018 | Sun |
| 2019/0234392 | A1 | 8/2019 | Grosse-Kracht et al. |
| 2019/0264956 | A1 | 8/2019 | Petersen et al. |
| 2019/0277285 | A1 | 9/2019 | Cho et al. |
| 2021/0239124 | A1 | 8/2021 | Stefanovic et al. |

FOREIGN PATENT DOCUMENTS

| | | | |
|---|---|---|---|
| CN | 107394947 | A | 11/2017 |
| CN | 109838940 | A | 6/2019 |
| EP | 0730128 | A1 | 9/1996 |
| JP | 06050276 | A | 7/1992 |
| JP | 2016142177 | A | 8/2016 |
| JP | 2020112321 | A * | 7/2020 |
| WO | 2016/112363 | A1 | 7/2016 |
| WO | 2019/229352 | A1 | 12/2019 |

OTHER PUBLICATIONS

Communication pursuant to Article 94(3) EPC from counterpart European Application No. 21161130.6 dated Feb. 3, 2023, 7 pp.

Extended Search Report from counterpart European Application No. 21159755.4, dated Jul. 20, 2021, 9 pp.

Response to Extended Search Report dated Jul. 20, 2021, from counterpart European Application No. 21159755.4, filed Sep. 21, 2021, 62 pp.

Response to Communication pursuant to Article 94(3) EPC dated Feb. 3, 2023, from counterpart European Application No. 21161130.6 filed May 26, 2023, 10 pp.

* cited by examiner

COMPRESSOR SENSOR MOUNT

This application claims the benefit of U.S. Provisional application No. 62/989,455, entitled "VAPOR COOLED CENTRIFUGAL COMPRESSOR AND A HOUSING FOR THE COMPRESSOR" and filed on Mar. 13, 2020, and U.S. Provisional application No. 63/002,806, entitled "VAPOR CYCLE COOLING" and filed on Mar. 31, 2020, which are incorporated herein by reference in their entirety.

TECHNICAL FIELD

The present disclosure relates to systems and techniques for producing conditioned air for a vehicle cabin (e.g., an aircraft cabin, an automobile cabin, a spacecraft cabin, a watercraft, etc.), and more particularly, to compressor systems and techniques for producing compressed vapor refrigerant.

BACKGROUND

A vapor cooling system may cool a fresh air stream using a refrigerant. The vapor cooling system compresses and condenses the refrigerant from a relatively low-pressure vapor to a relatively high-pressure liquid, which then expands and evaporates to remove heat from the fresh air stream. Compression of the refrigerant may use substantial amounts of power, produce substantial amounts of heat, and account for a substantial portion of a weight of the vapor compression system.

SUMMARY

In one example, the disclosure is directed to a compressor housing of a centrifugal compressor system, the compressor housing configured to house a compressor motor, an inlet housing, and a separation plate that is interposed between the compressor motor and the inlet housing, the compressor housing comprising: a first portion configured to house the compressor motor, wherein the first portion includes a refrigerant inlet port configured to route incoming vapor into the first portion, wherein the incoming vapor, when flowing through the first portion, is configured to cool the compressor motor; and a second portion configured to house the separation plate and the inlet housing, wherein the second portion includes an outlet port configured to flow the refrigerant an outside of the compressor housing, wherein the compressor housing is configured to allow the refrigerant to flow through the first portion to the second portion, and, when flowing to the second portion, to pass by the outlet port before the refrigerant routes to an inlet of the inlet housing.

In another example, the disclosure is directed to a centrifugal compressor comprising a compressor housing and a centrifugal compressor, wherein the centrifugal compressor comprises a compressor motor configured to rotate on a plurality of journal bearings, wherein a refrigerant is configured to flow through the compressor motor. The centrifugal compressor further comprises: a separation plate configured to engage with the compressor housing; an inlet housing comprising an inlet that allows refrigerant to enter the inlet housing; at least one impeller; and the scroll housing; and wherein the compressor housing includes: the centrifugal compressor within the compressor housing. In addition, the compressor housing defines a primary flow path for the refrigerant to flow (i) through an inlet port of the compressor housing, (ii) through the compressor motor, and (iii) to the inlet of the inlet housing.

In another example, the disclosure is directed to a method that includes a centrifugal compressor configured to compress refrigerant, the method comprising: receiving vapor refrigerant into an inlet port of a compressor housing, providing a flow path for the vapor refrigerant to pass through the compressor housing, cooling the compressor motor using the vapor refrigerant, compressing the vapor refrigerant, and discharging the compressed vapor refrigerant.

In another example, the disclosure is directed to a method that includes a centrifugal compressor configured to compress refrigerant, the method comprising: receiving vapor refrigerant into an inlet port of a compressor housing, providing a flow path for the vapor refrigerant to pass through the compressor housing, cooling the compressor motor using the vapor refrigerant, compressing the vapor refrigerant, and discharging the compressed vapor refrigerant.

In another example, the disclosure is directed to a compressor housing of a centrifugal compressor, the compressor housing configured to house a compressor motor and an inlet housing, the compressor housing comprising: a first portion configured to house the compressor motor, wherein the first portion includes a refrigerant inlet port; a second portion configured to house the inlet housing, wherein the second portion includes an outlet port configured to flow the refrigerant to an outside of the compressor housing; and at least one refrigerant accumulator upstream of the second portion, wherein the at least one refrigerant accumulator is configured to accumulate refrigerant within the compressor housing of the centrifugal compressor.

In yet another example, the disclosure is directed to a compressor housing of a centrifugal compressor, the compressor housing comprising: a main housing portion, wherein the main housing includes an outlet port configured to discharge compressed vapor refrigerant; and a separate end housing portion, wherein the main housing portion and the end housing portion are configured to interface at a mating surface of the respective housing portions, wherein the mating surface of the respective housing portions is configured to provide a hermetically sealable surface between the main housing portion and the end housing portion, and wherein the outlet port is configured to receive an adaptor from outside of the compressor housing.

In another example, the disclosure is directed to a compressor housing of a centrifugal compressor, the compressor housing comprising: a main housing portion configured to house a compressor motor and an inlet housing, wherein the inlet housing is configured to receive vapor refrigerant downstream of the compressor motor; and an end housing portion, wherein the main housing portion and the end housing portion are configured to interface at a mating surface of the respective housing portions and define a volume, and wherein the end housing portion includes a sensor cavity extending into the volume toward the main housing portion.

In yet another example, the disclosure is directed to a vapor-compression system comprising: a condenser configured to condense a refrigerant using air from an environment, wherein the refrigerant has a vapor density at 25° C. of less than about 15 $kg/m^3$, is non-ozone depleting, non-toxic, non-flammable, and has an ultra-low global warming potential (GWP); an evaporator configured to remove heat from a supply air stream using the refrigerant and discharge vapor refrigerant; and a centrifugal compressor configured to increase the pressure of the refrigerant, wherein the vapor-compression system has a cooling capacity of less than 35 kilowatts (kW).

In another example, the disclosure is directed to a method that includes a vapor cycle system that has a cooling capacity of less than 35 kilowatts (kW), the method comprising: condensing a refrigerant using air from an environment, wherein the refrigerant has a vapor density at 25° C. of less than about 15 kg/m$^3$, is non-ozone depleting, non-toxic, non-flammable, and has an ultra-low global warming potential (GWP); removing heat from a supply air stream using the refrigerant; discharging vapor refrigerant; increasing the pressure of the refrigerant.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

Like reference characters refer to like elements throughout the figures and description.

DETAILED DESCRIPTION

Figure 1:
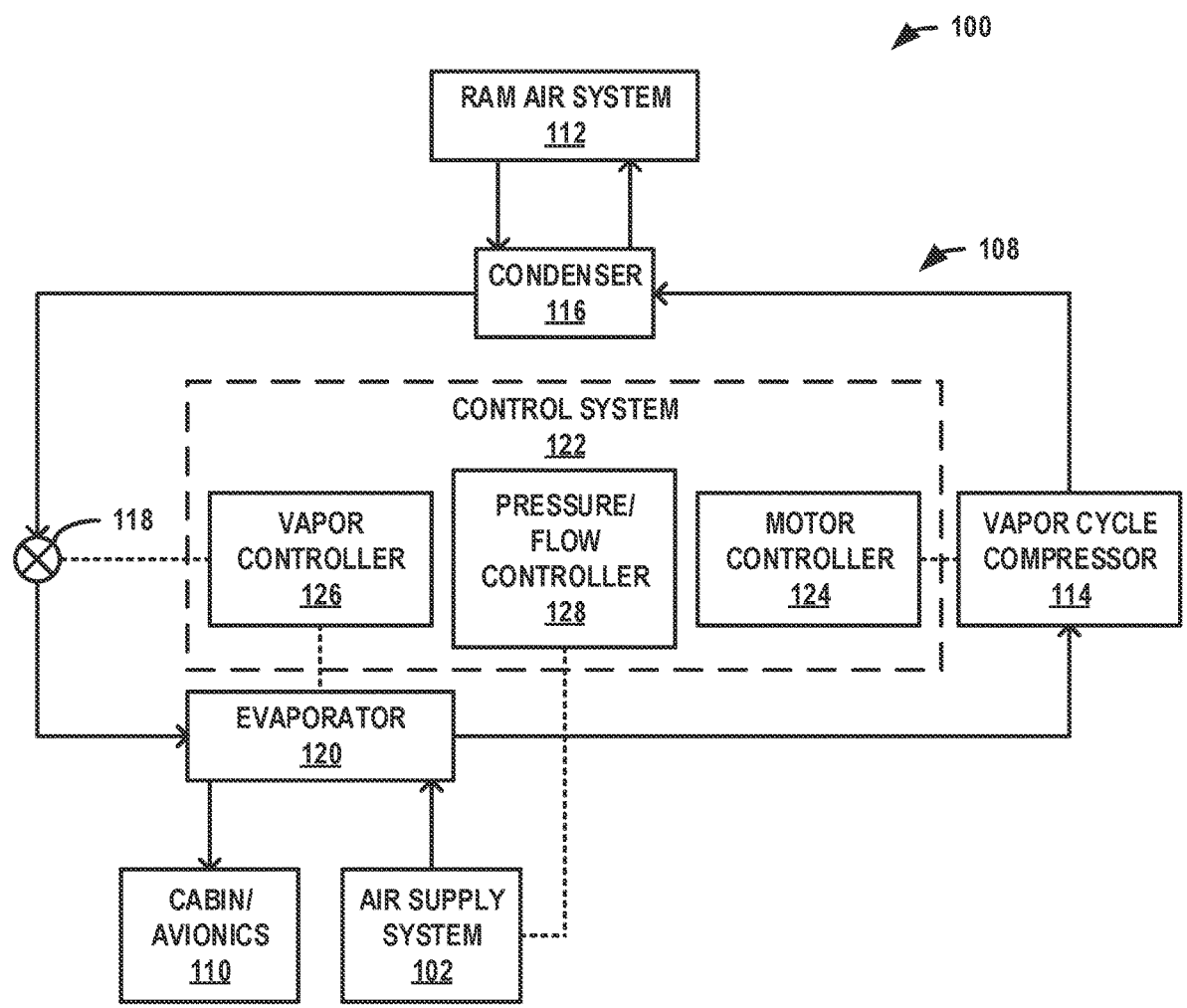
FIG. 1 is a block diagram illustrating a system for generating conditioned air that includes an example vapor cooling system (VCS).

Various examples discussed herein describe vapor cooling systems, vapor compression systems, centrifugal compressors, and centrifugal compressor components that may have reduced size, weight, and power consumption.

A centrifugal compressor is configured to drive one or more impellers using a compressor motor to compress a vapor refrigerant to a higher pressure. Components of the compressor, such as a motor stator, bearings, and/or a motor controller coupled to a housing of the compressor, may generate heat that requires cooling. The compressor may receive the vapor refrigerant and flow the vapor refrigerant across components of the compressor motor prior to entry of the vapor refrigerant into the one or more impellers. This flow of vapor refrigerant may remove heat from the components of the compressor to cool the components and heat the vapor refrigerant prior to entry into the one or more impellers. As a result, the compressor may reduce or eliminate external cooling, such as a cooling jacket. In addition, the compressor may receive vapor refrigerant from an evaporator at a lower temperature (e.g., at a lower superheat level).

In some examples, a portion of vapor refrigerant may condense in a centrifugal compressor or piping upstream of the compressor. If this liquid refrigerant is not removed, the liquid refrigerant may impinge on the one or more impellers. The centrifugal compressor may include an accumulator volume integrated with the compressor upstream of the one or more impellers. The accumulator volume may reduce a velocity of the refrigerant and collect the liquid refrigerant, such as through gravity or independent of an orientation of the accumulator. The accumulator volume may be positioned near one or more sources of heat, such as stators of the motor, such that a portion of the liquid refrigerant may absorb the heat and evaporate. As a result, the compressor may reduce an amount of liquid refrigerant received by the one or more impellers and/or reduce an amount of refrigerant in a vapor cycle system.

In some examples, to cool components within the centrifugal compressor, the vapor refrigerant may flow through a space between an impeller housing, including an outlet of the one or more impellers, and a compressor housing. A compressor outlet may extend through the space between the impeller housing and the compressor housing to fluidically couple the outlet of the one or more impellers to piping downstream of the compressor. The compressor outlet may permit radial movement of impeller housing to accommodate expansion or contraction of the impeller housing. As a result, the centrifugal compressor may permit vapor cooling throughout the centrifugal compressor while sealing the vapor refrigerant within the vapor compression system.

In some examples, the vapor refrigerant may have a relatively low evaporating pressure, such that the centrifugal compressor may compress a lower mass of vapor refrigerant corresponding to a lower cooling capacity. The lower operating pressures may enable thinner walls in the centrifugal compressor and/or may reduce leakage of refrigerant in the system. As a result, the centrifugal compressor may be used for lower cooling capacity applications with increased reliability.

In some examples, the centrifugal compressor may maintain a superheat of the vapor refrigerant by measuring a temperature of the vapor refrigerant prior to the vapor refrigerant entering the one or more impellers. The centrifugal compressor may include a sensor cavity that projects and/or extends into a volume of the centrifugal compressor near an inlet to the one or more impellers. In some examples, a temperature sensor is positioned within the sensor cavity and external to a compressor housing, such that the sensor cavity is relatively close to an impeller inlet and/or away from the inner surfaces of the compressor housing. The temperature sensor may detect a temperature of the vapor refrigerant near the impeller inlet, e.g., nearer to the impeller inlet than the inner surfaces of the compressor housing and be capable of removal without opening a containment of the vapor cycle system. For example, the sensor cavity may be configured to removably attach a temperature sensor within the cavity, where the cavity is external to the compressor housing and extends within the volume of the compressor housing to enable a temperature of vapor refrigerant to be measured near an impeller inlet. The walls of the sensor cavity may be relatively thin and have a relatively high surface area. As a result, the centrifugal compressor may accurately measure a temperature of the vapor refrigerant with reduced maintenance cost. The sensor cavity may be configured to house a temperature sensor, e.g., a thermistor, a thermocouple, a resistance temperature detector (RTD), etc.

Vapor cooling systems, compressors, and compressor components discussed herein may be used to produce conditioned air for a variety of applications. In some examples, vapor cooling systems discussed herein may be used to cool pressurized air, such as for a pressurized cabin or avionics systems of an aircraft. In some examples, vapor cooling systems, including vapor-cooled compression systems, may be used, for aircraft and non-aircraft implementations, to cool liquid, non-pressurized air, etc., in accordance with one or more of the various techniques of this disclosure. In another example, vapor cooling systems, including vapor-cooled compression systems, may be used, for aircraft and non-aircraft implementations, to cool equipment, such as through direct contact-cooling of equipment.

FIG. 1 is a block diagram illustrating an example system 100 for generating conditioned air that includes a vapor cooling system (VCS) 108. The conditioned air may be used to cool volumes or components of various cabins or avionics systems 110. Cabin/avionics 110 may be a compartment of a vehicle (e.g., an aircraft, an automobile, a spacecraft, a watercraft, etc.) that includes an internal environment and/or one or more avionics systems that receive cooled air for cooling equipment. For example, cabin/avionics 110 may be configured to house people, cargo, and the like, in the internal environment. It will be understood that avionics generally relate to aircraft, spacecraft, etc., and that other systems may include other electronic systems/control systems configured for cooling. Thus, while described as cabin/avionics 110, the techniques of this disclosure are not so limited, and a person skilled in the art will understand that the systems described herein may be employed in a variety of contexts without significantly departing from structures and mechanics described herein.

VCS 108 includes a vapor cycle compressor (VCC) 114, a condenser 116, an expansion device 118 (e.g., an expansion valve), and an evaporator 120 fluidically coupled to each other through pressurized refrigerant supply lines to form a refrigerant circuit. A variety of refrigerants may be used in VCS 108, as will be explained further below.

VCC 114 may be configured to receive vapor refrigerant from evaporator 120 and compress and pump vapor refrigerant to condenser 116. VCC 114 may include a centrifugal compressor configured to receive the vapor refrigerant at an inlet pressure and discharge the vapor refrigerant at a higher outlet pressure. VCC 114 may include one or more compression stages and an electrically driven motor. The motor may be configured to receive electrical power, such as from a motor controller 124, and generate mechanical power to drive the one or more compression stages. Condenser 116 may be configured to receive saturated vapor refrigerant from VCC 114, condense the vapor refrigerant, and discharge saturated refrigerant to an expansion device 118. Condenser 116 may be cooled by environmental air, such as ram air flow, from a ram air system 112, or another fluid such as fuel or heat transport fluids.

Expansion device 118 may be configured to control flow of refrigerant to evaporator 120 and reduce a pressure of saturated refrigerant prior to entry into evaporator 120. Expansion device 118 may be an orifice, tube, metered valve, or other device configured to reduce a pressure of a saturated refrigerant. Evaporator 120 may be configured to receive cabin pressure air, such as from an air supply system 102, remove heat from cabin air using a refrigerant, and discharge cabin air to cabin/avionics 110. On a refrigerant side, evaporator 120 may be configured to receive saturated refrigerant, absorb heat from the cabin air, vaporize the refrigerant, and discharge superheated vapor refrigerant.

System 100 includes a control system 122 for controlling various conditions of VCS 108, such as refrigerant flow rate, refrigerant vapor composition, refrigerant temperature, and the like. Control system 122 may be configured to monitor and/or operate one or more process control components of system 100. For example, control system 122 may be communicatively coupled to any of air supply system 102, ram air system 112, VCC 114, expansion device 118, or any other component of system 100. Control system 122 may also be communicatively coupled to instrumentation, such as flow meters, temperature sensors, and pressure sensors, and configured to receive measurement signals from the instrumentation. For example, control system 122 may be configured to receive measurement signals for various parameters of VCS 108, such as a speed of VCC 114, temperature of cabin air leaving evaporator 120, or a superheat of vapor refrigerant entering VCC 114, determine a mismatch between the measurement signals and a setpoint for the corresponding parameter, and send a control signal to one or more components of system 100 to reduce the mismatch and return the parameter to within the setpoint. Control system 122 may include any of a wide range of devices, including processors (e.g., one or more microprocessors, one or more application specific integrated circuits (ASICs), one or more field programmable gate arrays (FPGAs), or the like), servers, desktop computers, notebook (i.e., laptop) computers, tablet computers, and the like.

Control system 122 may include a motor controller 124 configured to control a motor of VCC 114. As discussed above, a motor may provide mechanical power to one or more impellers of VCC 114, and therefore modulate flow rate of refrigerant through VCS 108. The speed of VCC 114 may correspond to various temperature setpoints of VCS 108, such as cooling demands of evaporator 120 and inlet superheat of the vapor refrigerant into VCC 114. To control a speed of VCC 114, motor controller 124 may be configured to send control signals to VCC 114 to control an amount of electrical power to the motor of VCC 114, such as from an APU or other power supply. Control system 122 may include a vapor controller 126 configured to control a vapor composition of the refrigerant in VCS 108. To control a vapor composition of the refrigerant, vapor controller 126 may be configured to send control signals to expansion device 118 and/or evaporator 120 to control a position of expansion device 118 and/or a position of a bypass valve of evaporator 120, such as by closing expansion device 118 to increase a superheat of the refrigerant entering VCC 114. Control system 122 may include a pressure/flow controller 128 configured to control pressure and/or flow of supply air to evaporator 120. In some examples, pressure/flow controller 128 may be configured to control air supply system 102 to generate a particular flow of supply air from air supply system 102. For example, pressure/flow controller 128 may be configured to send control signals to air supply system 102 to control a pressure of supply air, such as by controlling an amount of bleed air or a speed of a load compressor (via an APU) or cabin air compressor. In some examples, pressure/flow controller 128 may be configured to control ram air system 112 in order to receive a particular flow of supply air from ram air system 112.

Vapor cooling system (e.g., vapor compression systems) discussed herein may include a centrifugal compressor to compress a vapor refrigerant and cool various components of the compressor using the vapor refrigerant as a cooling medium. For example, a compressor motor, shaft bearings, and other components of the centrifugal compressor that receive power and/or experience friction may produce heat that needs to be removed. Rather than remove this heat using external cooling, which may be heavy or inefficient to operate, centrifugal compressors described herein may use the incoming vapor refrigerant to cool various components of the centrifugal compressor, thereby reducing or eliminating external cooling of the centrifugal compressor.

Figure 2:
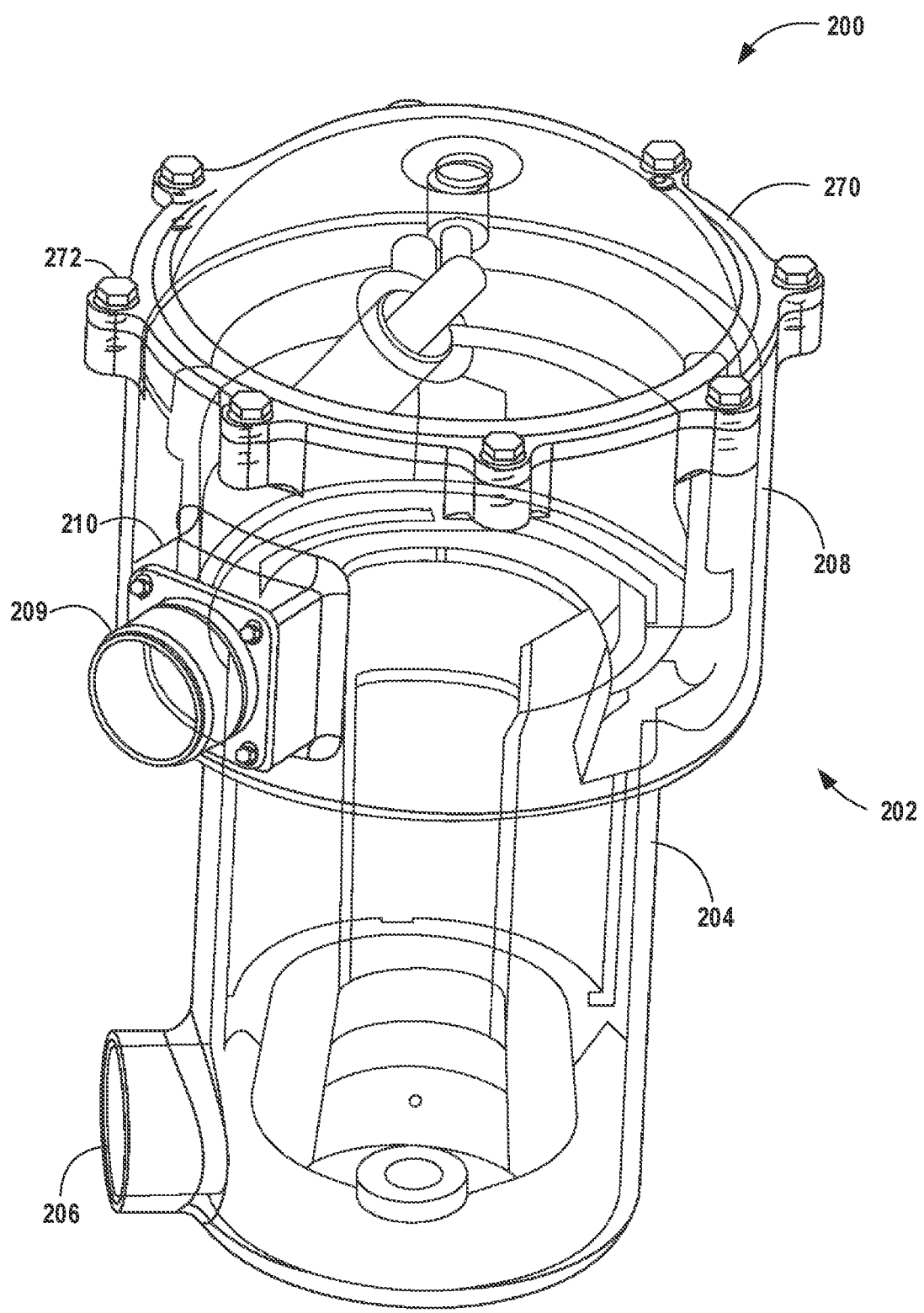
FIG. 2 is a perspective view diagram illustrating an example centrifugal compressor, in accordance with one or more techniques of this disclosure.

Centrifugal compressors described herein may be configured to form a relatively tight containment to hermetically seal the vapor refrigerant within the vapor compression system. FIG. 2 is a perspective view, partially transparent diagram illustrating an example centrifugal compressor 200, in accordance with one or more techniques of this disclosure. Centrifugal compressor 200 may be used as VCC 114 in the example system 100 of FIG. 1. Centrifugal compressor 200 includes a compressor housing 202 and an end housing 270. Compressor housing 202 may be configured to house centrifugal compressor 200 flow vapor refrigerant therethrough, with example compressor systems shown in additional figures.

As illustrated in FIG. 2, compressor housing 202 may be a main compressor housing that substantially defines a volume within centrifugal compressor 200. Compressor housing 202 may mate with end housing 270 to form an enclosure for the components of centrifugal compressor 200. Centrifugal compressor 200 may include one or more mechanisms to secure compressor housing 202 and end housing 270. In some examples, a set of bolt holes may be included on each mating surface of end housing 270 and compressor housing 202. In such examples, end housing 270 and compressor housing 202 may be sealed using a set of bolts 272. In some examples, end housing 270 and compressor housing 202 may be sealed by other means, such as welding, adhesives, etc.

Compressor housing 202 and end housing 270 may be configured to hermetically seal the vapor refrigerant from an environment outside of compressor 200. For example, centrifugal compressor 200 may be hermetically sealed by substantially containing the vapor refrigerant within compressor housing 202 and substantially preventing outside air from breaching compressor housing 202 at normal operating pressures of the vapor refrigerant. In some instances, end housing 270 may be integral with main housing 202, so as to form a single hermetically sealed compressor 200 (e.g., using additive manufacturing to form the housing to enclose components of compressor 200). For example, FIG. 5 described below illustrates an example of end housing 270 and compressor housing 202 sealed by other means. As a result, a hermetic seal may be formed between the end housing 270 and the second portion 208 that is sufficient to prevent a flow of low-pressure vapor refrigerant through the hermetic seal or any other portion of compressor 200.

Compressor housing 202 may include two or more portions configured to house various components of compressor 200. As shown in FIG. 2, compressor housing 202 includes a first portion 204 and a second portion 208. Compressor housing 200 may include various ports to receive and discharge vapor refrigerant and deliver electrical power to various electrical components. Compressor housing 202 includes an inlet port 206 configured to receive vapor (and, potentially, a portion of liquid) refrigerant, such as from evaporator 120 illustrated in FIG. 1. As shown, inlet port 206 is included with first portion 204. Compressor housing 202 includes an outlet port 302 (e.g., a compressed vapor outlet port) configured to discharge vapor refrigerant, such as to condenser 116 illustrated in FIG. 1. Outlet port 302 is not shown by the particular view of FIG. 2, but is shown in other figures.

In some examples, first portion 204 of compressor housing 202 may have a first substantially cylindrical shape and second portion 208 of compressor housing 202 may have a second substantially cylindrical shape. In some examples, the first substantially cylindrical shape may have a first outer diameter and the second substantially cylindrical shape may have a second outer diameter that is greater than the first outer diameter, such that the second substantially cylindrical shape is wider than the first substantially cylindrical shape.

Figure 3:
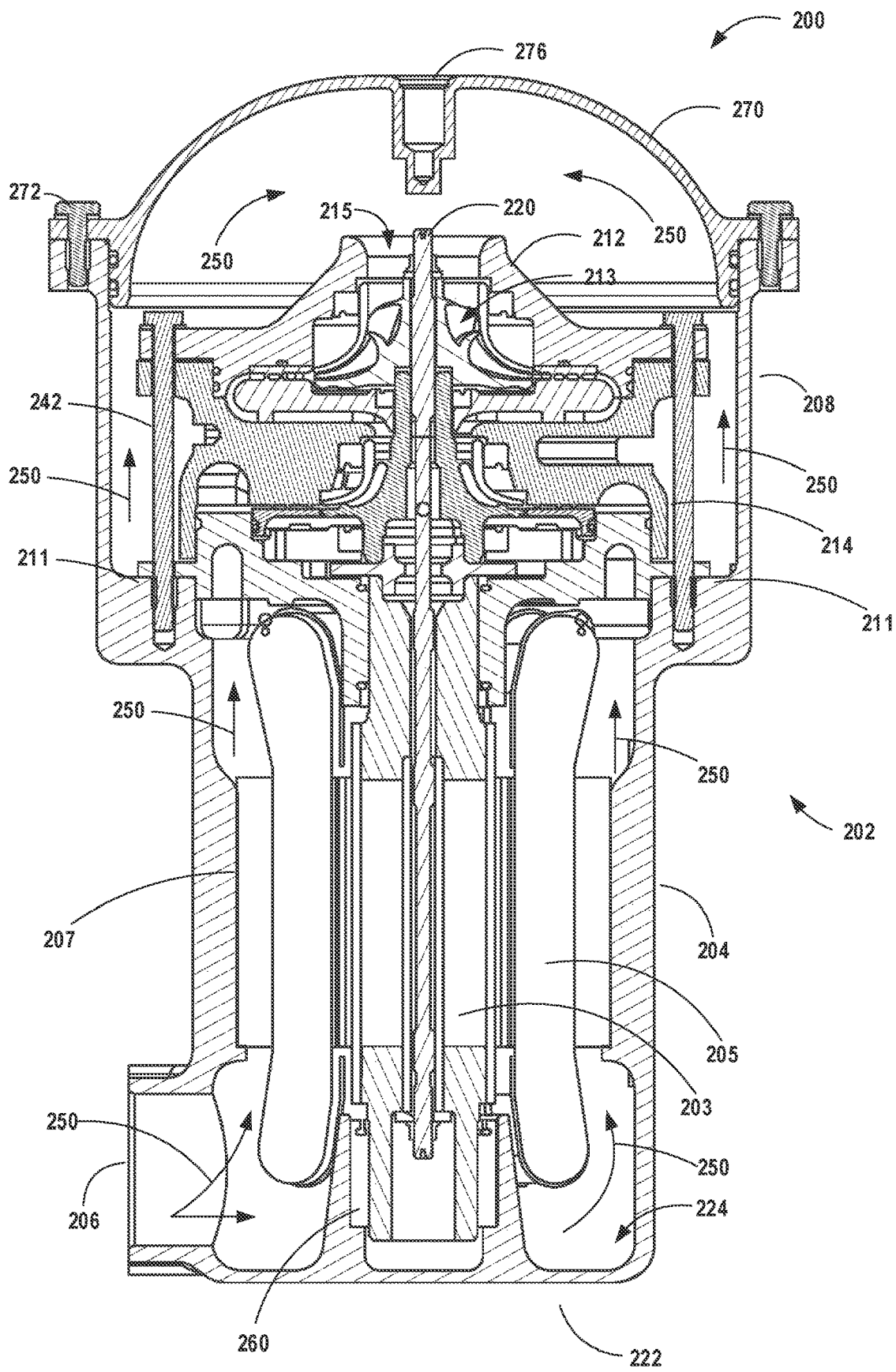
FIG. 3 is a cross-sectional side view diagram illustrating an example centrifugal compressor, in accordance with one or more techniques of this disclosure.

Centrifugal compressors described herein may include one or more flow paths through which vapor refrigerant may flow to remove heat from various components of the centrifugal compressors. FIG. 3 is a cross-sectional view of an example centrifugal compressor 200, in accordance with one or more techniques of this disclosure. Centrifugal compressor 200 includes a compressor motor 207, an impeller assembly that includes at least one impeller 213, and a shaft 220 mechanically coupling compressor motor rotor 203 to the at least one impeller 213.

Compressor motor 207 is configured to drive rotor 203 to rotate the at least one impeller 213. Centrifugal motor may include windings of a stator 205 coupled to compressor housing 202 and a rotor 203 coupled to shaft 220. Windings of stator 205 may be configured to receive electrical signal from a motor controller and generate a dynamic magnetic field to drive rotor 203. In some examples, compressor motor 207 may be configured to rotate impeller 213 at approximately 80,000 rotations per minute (RPMs) or at a higher rotations per minute. For example, compressor motor 207 may be configured to spin impeller 213 at approximately 120,000 RPMs.

The impeller assembly may be configured to provide one or more stages of compression for compressor 200. In the example of FIG. 3, compressor 200 is illustrated as a two-stage compressor in which the impeller assembly includes a first stage impeller and a second stage impeller that is downstream of the first stage impeller. In such examples, one or both impellers may be a shroudless impeller wheel. For example, the first stage impeller 213 may be a shroudless impeller wheel. In some examples, the impeller assembly includes a shroud that interfaces with an inlet housing 212. In such examples, the shroud is interposed between inlet housing 212 and the at least one impeller 213. In some examples, a clearance is formed between the at least one impeller 213 and inlet housing 212 to allow for the at least one impeller 213 to not have a shroud (e.g., a shroudless impeller wheel). Although shown as having a two-stage compressor, the techniques of this disclosure are not so limited, and the compressor may comprise a more or less compressor stages in some instances. For example, the compressor may include only one impeller 213, or could have three or more.

In some examples, compressor housing 202 and various components of compressor 200 may define a flow path 250 through compressor 200 for vapor refrigerant from an inlet port 206 to an outlet port (not shown). Vapor refrigerant may enter compressor 200 through inlet port 206 into first portion 204. The vapor refrigerant may flow through separation plate 211 into second portion 208 and into an opening 215 of inlet housing 212. As the vapor refrigerant flows over surfaces of components of compressor 200, the vapor refrigerant may remove heat from the components. For example, various components of the compressor motor, such as motor stators, may produce relatively large amounts of heat. Rather than remove this heat using an external cooling jacket, compressor 200 may remove at least a portion of the heat from the compressor motor through convection by flowing vapor refrigerant over the components. As such, compressor housing 202 may define flow path 250 such that vapor refrigerant washes over (e.g., contacts surfaces of) compressor motor 207 housed in first portion 204 as the refrigerant vapor flows from inlet port 206 to opening 215 of inlet housing 212.

In addition to cooling the various components within compressor housing 202, heat removal by the vapor refrigerant may provide an additional stage of heating for the vapor refrigerant, thus enabling the vapor refrigerant received by compressor 200 to be at a lower temperature (and corresponding vapor composition) and/or ensuring that vapor refrigerant received by the one or more impellers 213 is superheated. In an example, the vapor refrigerant at the one or more impellers 213 may have a higher superheat than the vapor refrigerant entering compressor 200, such that the vapor refrigerant at the at least one impeller may have a temperature greater than the saturation temperature of the refrigerant and ensuring that the vapor refrigerant at the one or more impellers 213, and entering opening 215 of inlet housing 212, is substantially all gas. This lower temperature vapor refrigerant entering compressor 200 may enable a smaller evaporator 120 sized for a smaller heating capacity. After removing heat from the compressor motor, the vapor refrigerant may then be compressed, via the at least one impeller 213, and discharged from centrifugal compressor 200 via outlet port 302. In some examples, the vapor refrigerant includes a low-pressure refrigerant (e.g., a refrigerant having a relatively low saturation vapor pressure). For example, the refrigerant gas may be R-1233zd, r236fa, or r245fa, or a similar low-pressure refrigerant, as described herein.

In some examples, a portion of the vapor refrigerant, after entering inlet housing 212, may be routed elsewhere to cool other components of compressor 200. For example, various components of centrifugal compressor 200 that support shaft 220, such as the bearings, may experience friction that produces heat. To cool these various components, the portion of vapor refrigerant may flow down shaft 220 and through compressor motor 207 to a bearing holder 260 at an aft surface 222 of first portion 204 opposite end housing 270. This portion of the vapor refrigerant may remove heat from the various components and discharge back into a volume of compressor housing 202. Bearing holder 260 may sit in a cavity at the aft side, as described herein. As shown, the aft side has an outer aft surface 222.

In some examples, compressor housing 202 further includes an electrical port 210. In some examples, electrical port 210 may include an electrical port attachment 209. The electrical port attachment 209 may attach, or be otherwise secured, to electrical port 210 so as to form an electrical connection port. In some examples, electrical port attachment 209 may attach to electrical port 210 via a plurality of bolts. In any case, electrical port 210 or electrical port attachment 209 of the electrical connection port may be configured to form an electrical connection with an electrical connector (not shown). The electrical connector (not shown) may provide electrical power to a compressor motor 207 (shown in FIG. 3) and pass electrical signals from any sensors internal to the compressor. That is, the electrical port 210 may be configured to receive electrical power that may be used to operate compressor motor 207. In some examples, the electrical connection port is configured to be hermetically sealed.

Centrifugal compressor 200 may include one or more sensors configured to detect various properties of the vapor refrigerant. Some sensors may be internal to the compressor. For example, a sensor may be embedded in the windings of stator 205 to detect motor temperature for purposes of protecting against motor overheat. Compressor housing 202 may be configured to position the various sensors within a volume of compressor housing 202. As discussed in more detail below, in some examples, end housing 270 may include one or more sensor ports, e.g., sensor cavity 274, that may be configured to house one or more temperature or pressure sensing devices. Sensor cavity 274 may be configured to allow for the one or more temperature and/or pressure sensing devices to measure the temperature or pressure of the vapor refrigerant as the vapor refrigerant flows along path 250. The sensed temperature and pressure may allow the degree of superheat to be detected and controlled, for example by modulating expansion device 118.

In some examples, compressor 200 may include one or more internal housings configured to position and/or secure components of compressor 200, such as compressor motor 207, shaft 220, and/or impellers 213, to compressor housing 202 and/or direct flow of vapor refrigerant through compressor housing 202. As illustrated in FIG. 3, compressor 200 may include separation plate 211, inlet housing 212, and a scroll housing 214.

Inlet housing 212 may be configured to receive vapor refrigerant and direct the vapor refrigerant into the impeller assembly. For example, vapor refrigerant in second portion 208 may flow across a surface of inlet housing 212 into opening 215 to contact one or more impellers 213 of the impeller assembly. In some examples, inlet housing 212 may secure to second portion 208 of compressor housing 202, such that inlet housing 212 may be positioned within compressor housing 202. For example, a bolt 242 may insert through inlet housing 212 and secure into a hole of the second portion 208 of compressor housing 202. In some examples, a set of bolts 242 may enter through inlet housing 212 and penetrate through separation plate 211.

In some examples, a sensor port (e.g., a sensor mount) may be on the inside of centrifugal compressor 200. In one example, a temperature sensor port may be on an outside surface of inlet housing 212, such as the ramped surface of inlet housing 212 shown in the example of FIG. 3. In such examples, a temperature sensor may be mounted to the sensor port on the inside of centrifugal compressor 200 prior to hermetically sealing the centrifugal compressor 200. In addition, an electrical connector may route from the sensor port to the electrical connector of centrifugal compressor 200.

Centrifugal compressor 200 may include a separation plate 211 that separates the compressor motor 207 from the impeller assembly. Separation plate 211 may be configured to separate compressed vapor refrigerant downstream of the impeller assembly from first portion 204. In some examples, separation plate 211 and inlet housing 212 may be configured to be connected via at least one bolt that extends into the at least one threaded hole. In some examples, separation plate 211 may include a bearing holder configured to house a bearing.

In some examples, centrifugal compressor 200 includes a scroll housing 214 interposed between separation plate 211 and inlet housing 212. Scroll housing 214 may be configured to separate one or more impellers 213 from an adjacent impeller and/or form a lateral boundary of the impeller assembly. In the example of FIG. 3, centrifugal compressor 200 may be a two-stage compressor that includes two impellers, such that scroll housing 214 may separate the two impellers. Although shown as a two-stage compressor, it will be understood that the techniques of this disclosure are not so limited, and that compressor 200 may include a single-stage compressor without scroll housing 214.

In some examples, separation plate 211, inlet housing 212, and scroll housing 214 may be configured to control flow of vapor refrigerant from second portion 208, through the impeller assembly, to the outlet port. For example, inlet housing 212 may form a distal boundary of the impeller assembly, scroll housing 214 may form a lateral boundary of the impeller assembly, and separation plate 211 may form a proximal boundary of the impeller assembly. In some examples, separation plate 211, inlet housing 212, and/or scroll housing 214 may be configured to permit a small amount of flow of vapor refrigerant to flow past various components along shaft 220. For example, various components of compressor 200 that produce heat, such as bearings along shaft 220, may not receive cooling from vapor refrigerant flowing through first portion 204 or second portion 208. To provide cooling to these components, separation plate 211, inlet housing 212, and/or scroll housing 214 may include clearances, passages, voids, or other openings that may pass small amounts of vapor refrigerant to the various components. In some examples, separation plate 211, inlet housing 212, and/or scroll housing 214 may be configured to flow vapor refrigerant from a lower stage in a multistage impeller, thereby providing a lower pressure vapor refrigerant (at a corresponding lower power) for cooling the various components than vapor refrigerant from a higher stage.

As explained above, compressor motor 207 is configured to drive one or more impellers 213 to compress the vapor refrigerant to a higher pressure. In some instances, a portion of the vapor refrigerant in flow path 250 may condense within or prior to being received by compressor housing 202. For example, compressor housing 202 may have a relatively large volume compared to piping upstream of compressor 200 and may have various surfaces at a lower temperature than the vapor refrigerant upstream of compressor 200. As the refrigerant enters into compressor housing 202 through inlet port 206, a portion of the vapor refrigerant may condense and become entrained in the flow of vapor refrigerant. In some instances, a portion of the vapor refrigerant in flow path 250 may condense in piping upstream of compressor 200, and therefore condensed droplets of refrigerant may inadvertently enter compressor housing 202. If this liquid refrigerant is not removed, the liquid refrigerant may impinge on one or more impellers 213, which may reduce an efficiency of compressor 200 and/or decrease a service life of the one or more impellers 213.

In accordance with one or more techniques of this disclosure, centrifugal compressors may include at least one refrigerant accumulator to remove condensate from vapor refrigerant. In the example of FIG. 3, compressor 200 includes accumulator 224 (e.g., an accumulator volume) integrated with compressor 200. Accumulator 224 may be configured to accumulate liquid refrigerant within compressor housing 202. In some examples, multiple refrigerant accumulators may be included within compressor housing 202 or end housing 270 to catch and hold onto liquid refrigerant regardless of changes in orientation with respect to gravity, such that accumulator 224 may operate independent of an orientation of accumulator 224 with respect to a direction of gravitational force. Accumulator 224 may be positioned upstream of one or more impellers 213. Accumulator 224 may reduce a velocity of the refrigerant and collect the liquid refrigerant (e.g., through gravity), such that the liquid refrigerant does not substantially travel into second portion 208 and impinge on the impeller assembly.

In some examples, accumulator 224 may be positioned near one or more internal or external sources of heat, such as stator 205 of compressor motor 207. For example, in addition to heating the vapor refrigerant, compressor motor 207 may discharge heat to one or more surfaces of compressor housing 202. In such examples, a portion of the condensed liquid refrigerant may absorb the heat and evaporate the liquid refrigerant to enter the gaseous state once again. By including an integrated refrigerant accumulator 224 within compressor 200, compressor 200 may reduce an amount of liquid refrigerant that may enter or impinge on the one or more impellers 213 and/or reduce an amount of refrigerant in a vapor cycle system as a whole.

Compressor housing 202 may be configured to encase vapor-cooled compressor motor 207 within a first area (e.g., volume) of compressor housing 202 (e.g., a first area of first portion 204). A second area of compressor housing 202 (e.g., a second area of first portion 204) may include the at least one refrigerant accumulator 224. In such examples, the second area may be upstream of the first area.

In some instances, compressor 200 may inject heat into or adjacent refrigerant accumulator 224 to evaporate liquid refrigerant that gets trapped or accumulates in refrigerant accumulator 224. For example, in the context of a vapor cycle system, the vapor cycle system includes a condenser. In such examples, a return line from the condenser may route through or around the one or more refrigerant accumulators 224. The injected heat may cause accumulated liquid refrigerant to return to the vapor state and rejoin the vapor cycle.

In some examples, refrigerant accumulator 224 may form a separate volume within compressor housing 202 that is separated by a porous structure, such as a porous wall. This porous wall may permit condensation droplets to enter refrigerant accumulator 224, substantially remain within accumulator 224 as liquid refrigerant, and only leave accumulator 224 as vapor refrigerant. In this way, the liquid refrigerant may remain substantially separated from the vapor refrigerant. In some examples, accumulator 224 and/or compressor housing 202 may include one or more structures configured to assist in removing condensate from the vapor refrigerant. For example, the one or more structures may include baffles or other structures configured to block a flow path of the vapor refrigerant and cause condensate to impinge on the structures.

Figure 4:
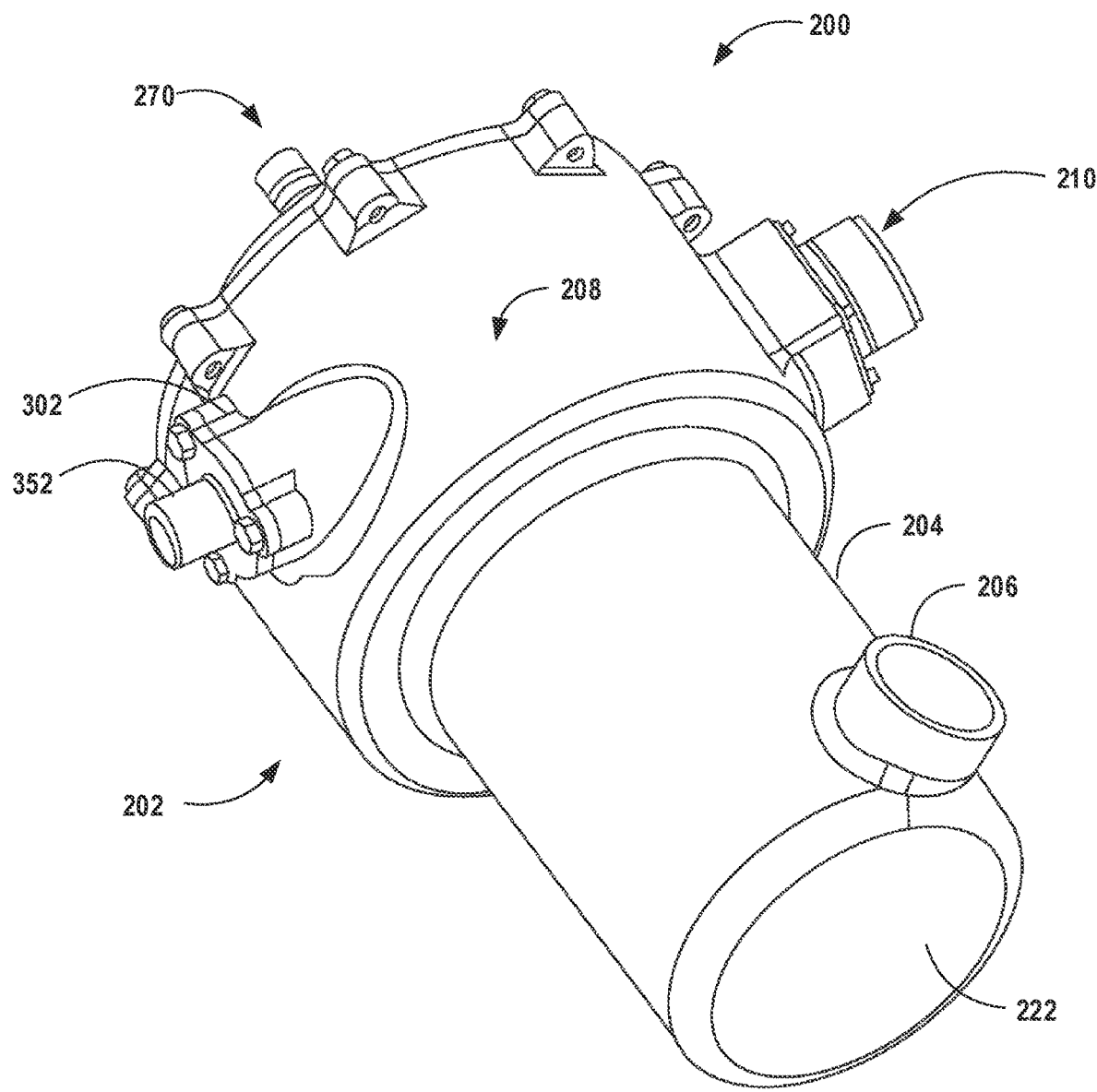
FIG. 4 is a perspective view diagram illustrating an example compressor housing, in accordance with one or more techniques of this disclosure.

In some examples, centrifugal compressors described herein may be configured to interface with one or more systems or components external to the centrifugal compressor housing. FIG. 4 is a perspective view diagram illustrating an example compressor 200 that includes compressor housing 202 and end housing 270, in accordance with one or more techniques of this disclosure.

First portion 204 includes an aft surface 222. In some examples, aft surface 222 may be configured to house a motor controller, as described herein. For example, a motor controller may be configured to control power to windings 205 of a stator to produce a desired amount of power. A higher speed compressor motor may have a corresponding smaller size and weight but may produce relatively higher amounts of heat due to the faster speed. To remove the heat from the motor controller, the motor controller may be thermally coupled to (e.g., directly or indirectly positioned on) aft surface 222. The motor controller may heat aft surface 222, and the vapor refrigerant within compressor housing 202 may remove at least a portion of the heat to cool the motor controller. In this way, the vapor refrigerant may replace or supplement a cooling system for the motor controller as a cooling source.

In some examples, first portion 204 includes a lateral side that is substantially cylindrical in shape. The lateral side includes the inlet port 206. In addition, first portion 204 includes cornered edges that are adjacent aft surface 222. In some examples, the cornered edges may be rounded as shown. For example, the cornered edges may be rounded at the joint of the lateral side and aft surface 222. In any case, the corner may be substantially 90 degrees and/or rounded so as to form one piece with aft surface 222.

In some examples, second portion 208 of compressor housing 202 has a lateral side that includes outlet port 302. Outlet port 302 may be configured to allow compressed refrigerant gas to exit compressor housing 202. The outlet port 302 may be configured to receive an adapter 352, as discussed herein. In some examples, the second lateral side may also include electrical port 210, as shown.

The lateral side of second portion 208 may be substantially cylindrical. In some examples, the second lateral side(s) may be parallel to first lateral side(s). In some examples, a plurality of first lateral sides, including the first lateral side, define an outer diameter or circumference of first portion 204. Likewise, a plurality of second lateral sides, including the second lateral side, define an outer diameter or circumference of second portion 208. In some examples, the second outer diameter of second portion 208 is wider than the first diameter of first portion 204.

In some examples, the first portion 204 or second portion 208 may be substantially cylindrical. Even so, either side may include protrusions from the sides of housing 202. For example, the protrusions may form mounts (e.g., mounting legs, mounting attachments) for compressor 200. In addition, second portion 208 includes protrusions for outlet port 302 and electrical port 210. Otherwise, compressor 200 may be substantially cylindrical in shape, with varying widths for various portions of compressor 200.

Figure 5:
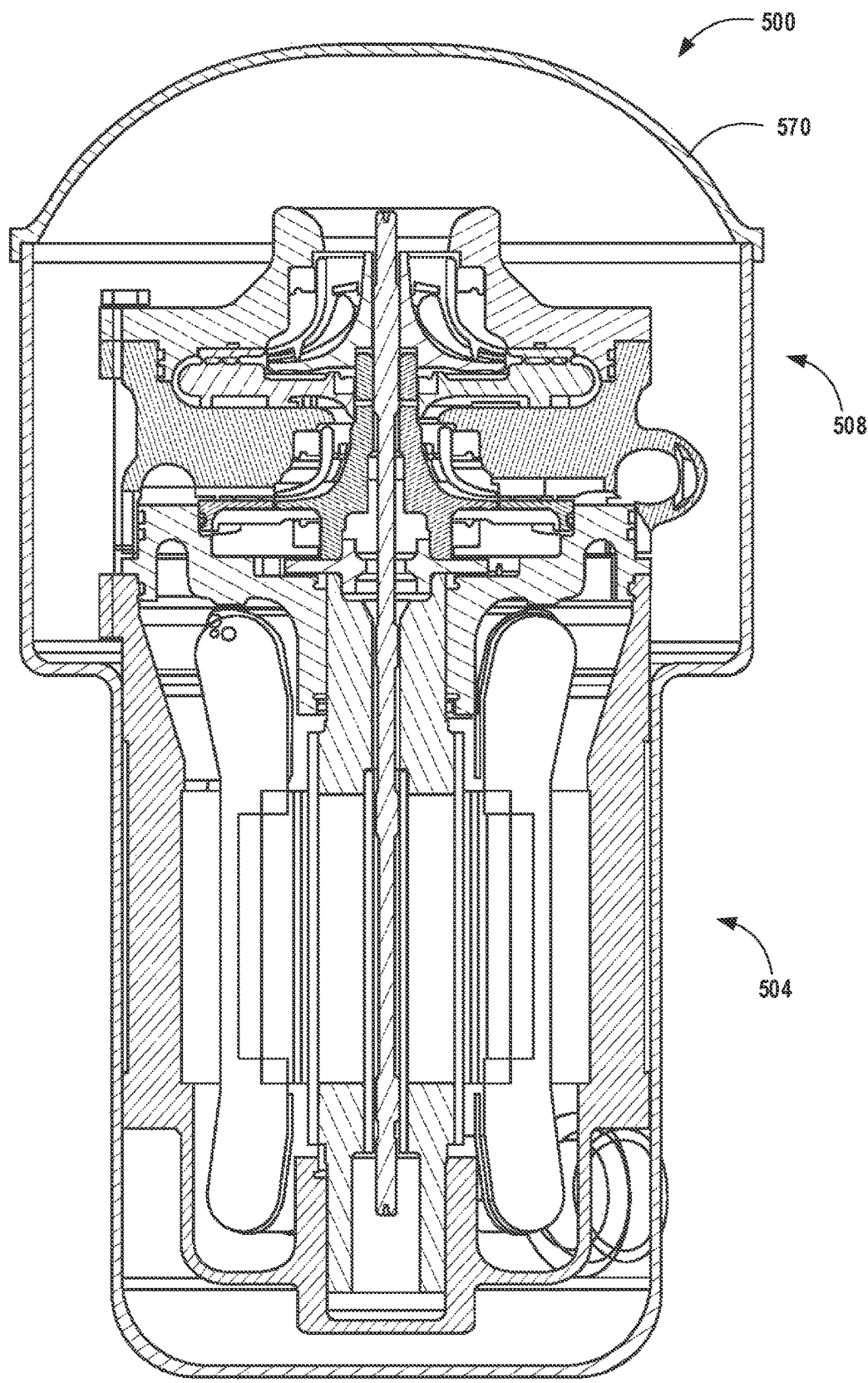
FIG. 5 is a cross-sectional side view diagram illustrating an example centrifugal compressor, in accordance with one or more techniques of this disclosure.

While compressor housing 202 and end housing 270 of FIG. 2 were described as bolted to provide a hermetically sealed housing, other example compressor housings may use alternative means for generating a hermetic seal. FIG. 5 is a cross-sectional view of an example centrifugal compressor 500, in accordance with one or more techniques of this disclosure. Centrifugal compressor 500 may be an example of VCC 114 or an example of centrifugal compressor 200. Centrifugal compressor 500 may be configured to have slight variations relative to centrifugal compressor 200. In any case, compressor 500 may include a first portion 504, a second portion 508, and an end housing 570, that correspond to first portion 204, second portion 208, and end housing 270, as those aspects are described herein. In some examples, as discussed above, compressor 500 may have a sealing mechanism for end housing 570 that does not use bolts to seal the end housing 570 to second portion 508. For example, end housing 570 may be welded to second portion 508. In any case, a hermetic seal may be formed between the end housing 570 and the second portion 508 that is sufficient to prevent a flow of low-pressure vapor refrigerant to flow through the hermetic seal or any other portion of the compressor 500. In some examples, the hermetic seal may be formed by welding end housing 570 to second portion 508.

In some examples, compressor 500 may include a separation plate that separates the impeller assembly from the compressor motor. In some examples, however, compressor 500 may resemble compressor 200 in that a separation plate may also separate the first portion 504 from second portion 508. In any case, the separation plate, similar to the description of compressor 200 herein, may include a bearing holder that is configured to hold a bearing. In addition, the separation plate may house the impeller assembly, such that at least one impeller is configured to rotate atop the separation plate.

Figure 6:
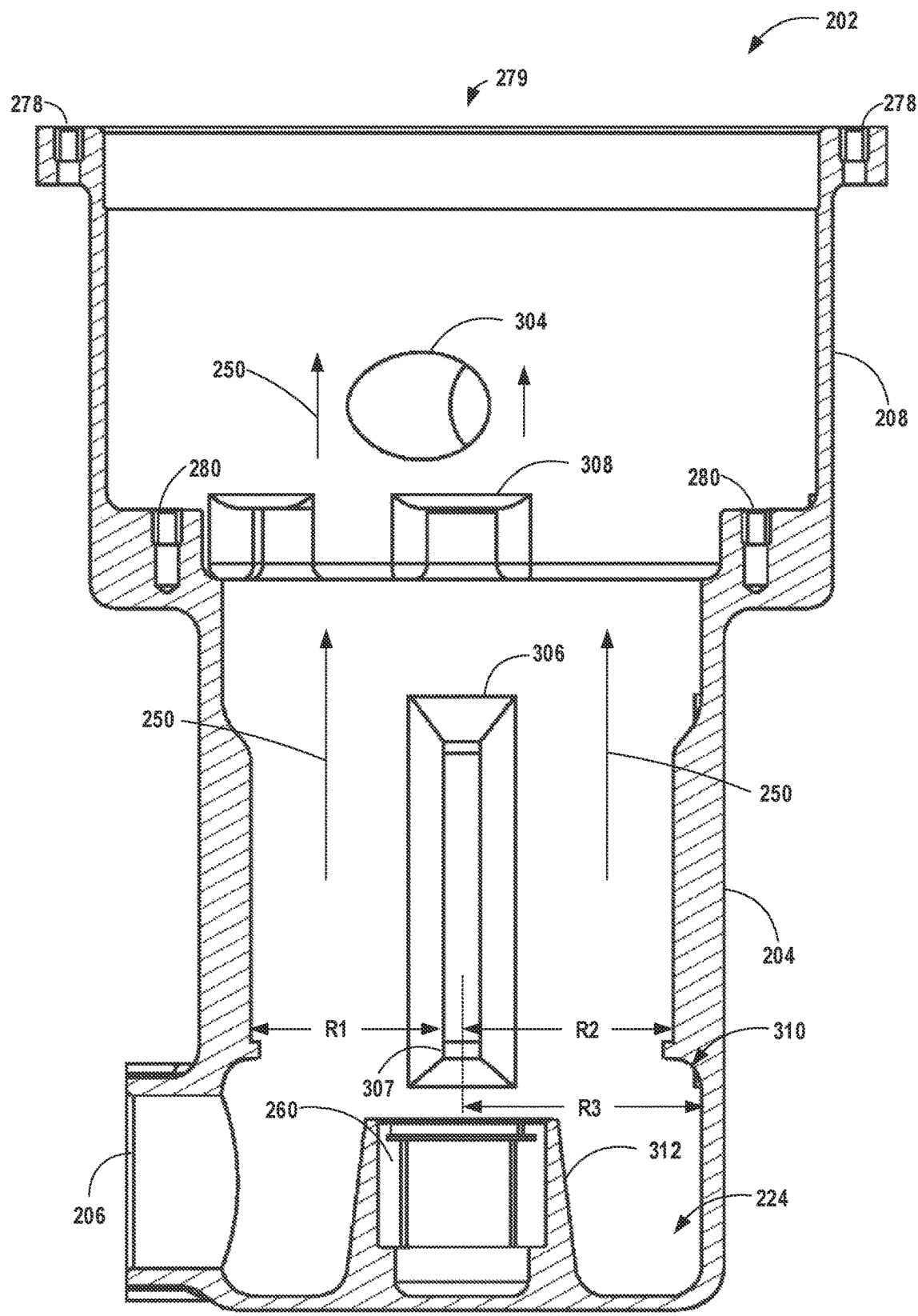
FIG. 6 is a cross-sectional side view diagram illustrating an example main compressor housing, in accordance with one or more techniques of this disclosure.

Compressor housings discussed herein may be configured to position various components of compressor 200 within compressor housing 202, such that the various components may be cooled by the vapor refrigerant. FIG. 6 provides a cross-sectional view of an inside view perspective of compressor housing 202. As shown, second portion 208 of compressor housing 202 may include a cutout 304 for outlet port 302. In some examples, cutout 304 may have an oblong shape. In addition, compressor housing 202 includes an opening 279 at a distal end (e.g., downstream end) of compressor housing 202. Opening 279 is configured to be closed and/or sealed by end housing 270. In some examples, opening 279 of second portion 208 includes an opening wide enough to allow compressor motor 207 to be inserted into and/or removed from compressor housing 202. As such, compressor 200 may be substantially assembled after compressor housing 202 has been wholly formed.

In some examples, compressor housing 202 may include a set of protruding ribs 306 extending from interior walls of compressor housing 202. For example, first portion 204 of compressor housing 202 includes a plurality of protruding ribs 306 configured to provide a press-fit connection between a stator portion of compressor motor 207 and protruding ribs 306. The set of protruding ribs 306 may be configured to position compressor motor 207 within first portion 204 of compressor housing 202, such that the vapor refrigerant may flow between compressor motor 207 and compressor housing 202. As a result, compressor housing 202 may define flow path 250 so as to allow vapor refrigerant to flow in a direction parallel to an alignment of the set of protruding ribs 306 (as shown).

In some examples, the set of protruding ribs 306 may be configured to remove heat from compressor motor 307 through conduction. For example, the set of protruding ribs 306 may include a relatively high thermal conductivity material, such that heat generated from compressor motor 307 may be removed to compressor housing 202. In some examples, the set of protruding ribs 306 may include at least four protruding ribs. In any case, protruding ribs 306 may be evenly spaced or unevenly spaced. In some examples, at least one of the protruding ribs 306 includes a lip 307 to secure the press-fit connection of compressor motor 207. In some examples, more than one protruding ribs 306 includes lip 307. In some examples, at least two of protruding ribs 306 include lips 307.

Additionally or alternatively, second portion 208 may include a set of protruding ribs 308. The set of protruding ribs 308 may be used to hold separation plate 211. For example, protruding ribs 308 may include holes 280. Holes 280 may be configured to receive an attachment mechanism that secures inlet housing 212 and separation plate 211 to an inside portion of second portion 208 of housing 202.

In some examples, first portion 204 may include an inner radius in an area corresponding to protruding ribs 306. For example, R1 is a radius from an inner surface of first portion 204 to one of protruding ribs 306. R2 is a radius from an inner surface to a center of one of protruding ribs 306. R3 may be a radius from an inner surface of first portion 204 to a center of one of protruding ribs 306. R2 may be less than R3, and R1 may be less than R2. The difference in radii in the portion that corresponds to accumulator 224 may provide a volume that can capture condensation and accumulate the condensation therein. Accumulator 224 may include a wall 310 that keeps the accumulated condensation from flowing into the area of first portion 204 that is configured to house compressor motor 207. In some instances, wall 310 may be a rounded wall, as shown. In some examples, accumulator 224 may span around a circumference of cavity 312. That is, accumulator 224 may include a volume on a side closer to inlet port 206.

In some examples, first portion 204 of the compressor housing includes a cavity 312 (e.g., a bearing-holder insert). In such examples, cavity 312 may protrude from first portion 204 of compressor housing 202. For example, cavity 312 may protrude from within the inside of compressor housing 202 in a direction toward the second portion 208 of compressor housing 202. In some examples, cavity 312 may be an integral part of compressor housing 202. For example, cavity 312 may be part of first portion 204 and in particular, part of an end surface of first portion 204 that faces toward the opening 279 of second portion 208.

In some examples, cavity 312 may be configured to receive a bearing holder 260. Bearing holder 260 may be configured to hold a journal bearing (e.g., a journal bearing holder). For example, bearing holder 260 may be configured to secure a journal bearing of compressor 200. The journal bearing (not shown) may include a foil bearing. In such instances, the journal bearing holder may include a bearing holding configured to secure a foil bearing (e.g., a foil-bearing holder).

In some examples, first portion 204 includes a cavity 312 at a first end of compressor housing 202. The first end is opposite an end of compressor housing 202 that includes opening 279. In some examples, cavity 312 is configured to receive a bearing holder 260. In some examples, cavity 312 is configured to serve as a bearing holder.

In some examples, second portion 208 of compressor housing 202 includes at least one hole 280. For example, second portion 208 of compressor housing 202 may include a plurality of holes 280, as shown. The at least one hole 280 may include a threaded hole 280 (e.g., bolt hole, insertable hole, threaded receiver, receiver, opening or cavity therethrough, etc.). Hole 280 may be located on the inside of compressor housing 202 (e.g., on an inside wall of the compressor housing). In some examples, hole 280 does not penetrate through to an outside surface of compressor housing 202. That is, as shown, holes 280 may provide a cavity that penetrates into compressor housing 202, where the cavity is open on one end and closed on all other ends and sides, as shown in FIG. 6. The cavity may be a threaded cavity (e.g., a bolt hole). That is, hole 280 may include a cavity having threading therethrough.

In some examples, compressor housing 202 includes only one opening 279 as sufficiently wide to insert or remove separation plate 211 and/or compressor motor 207. In other words, a side near the aft end of compressor 200 (e.g., the side of compressor 200 that is opposite opening 279) may be closed and sealed, such that aft surface 222 is not configured to be opened.

Figure 7:
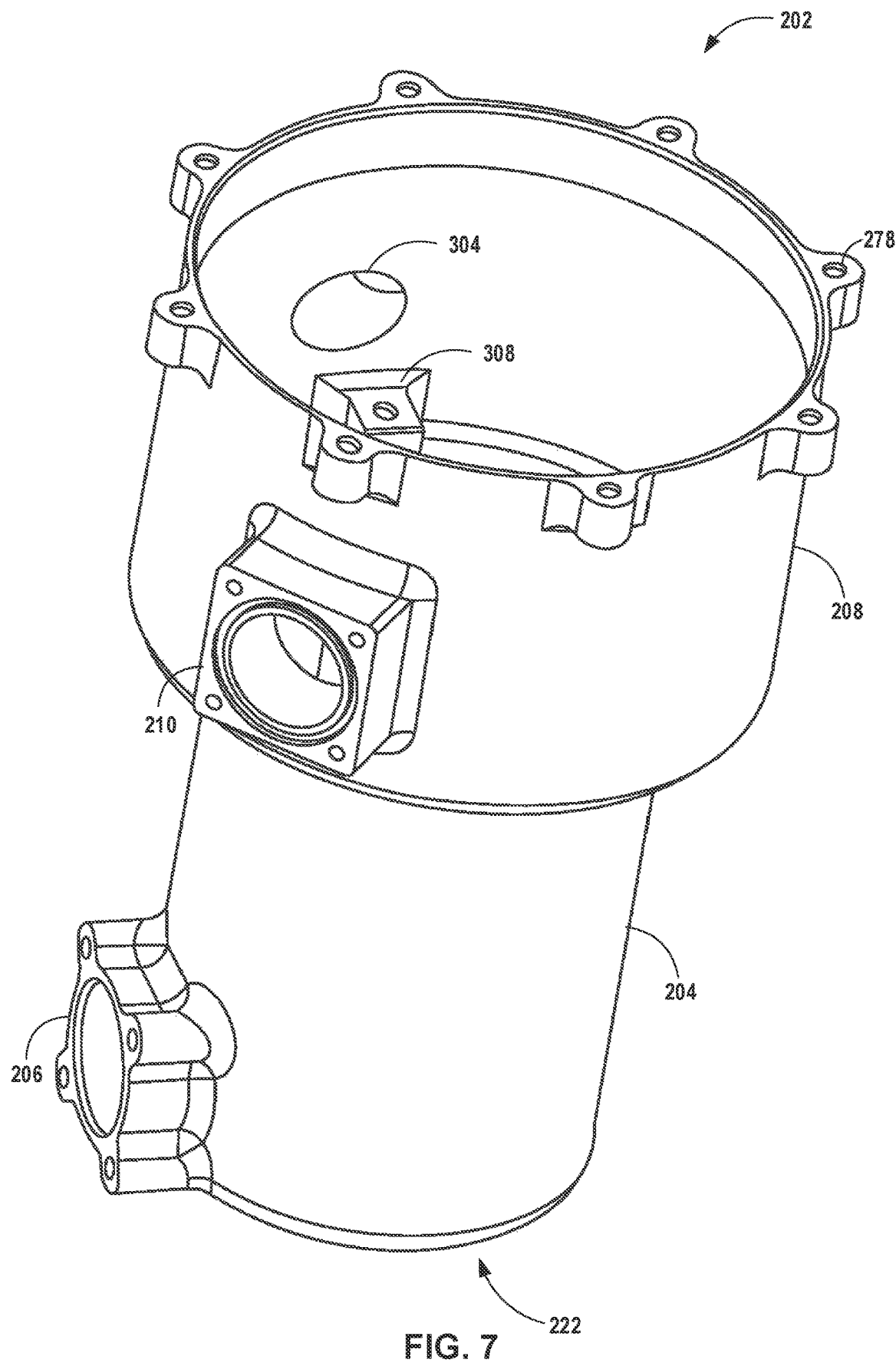
FIG. 7 is a perspective view diagram illustrating an example main compressor housing, in accordance with one or more techniques of this disclosure.
Figure 8:
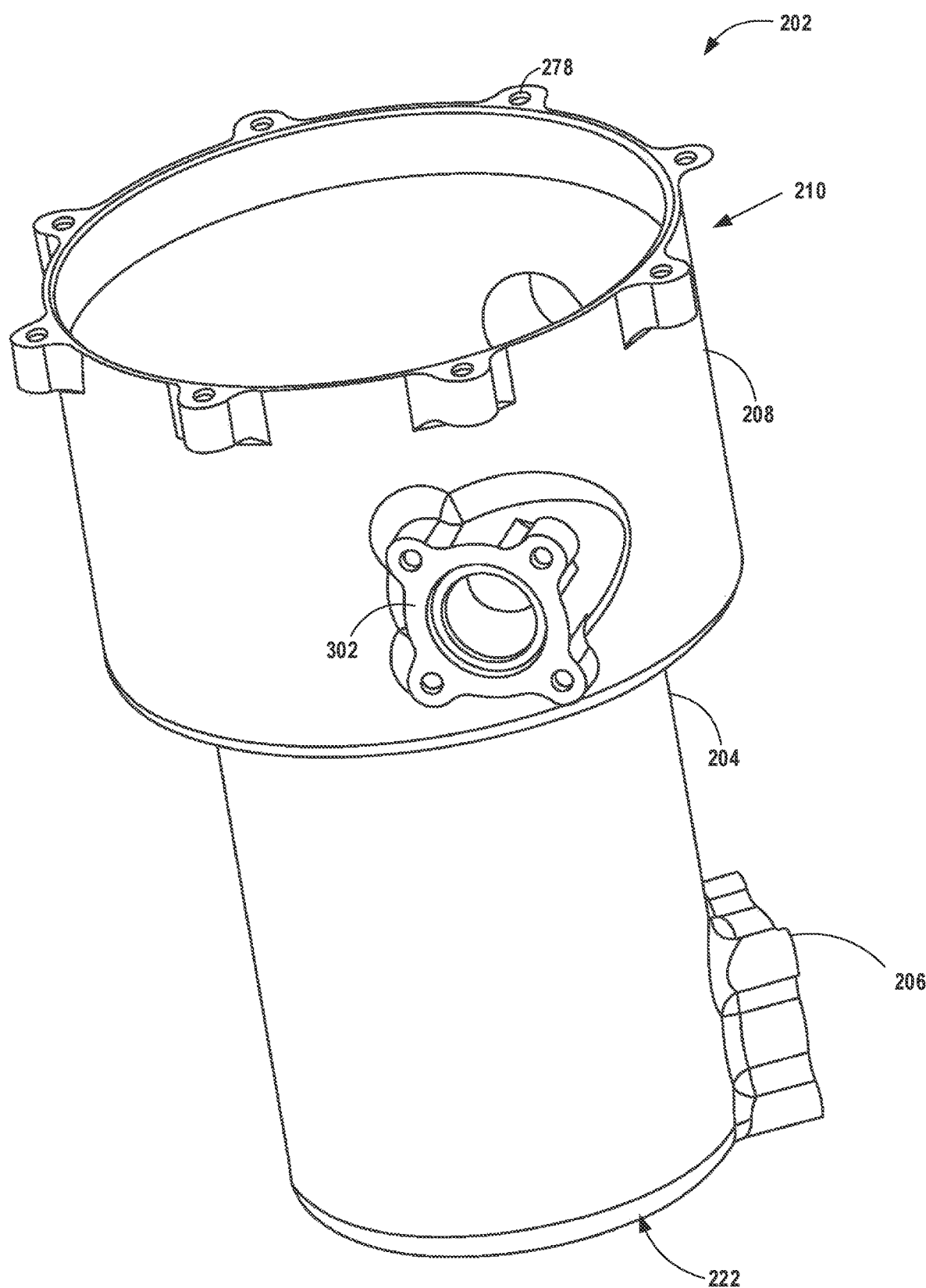
FIG. 8 is a perspective view diagram illustrating an example main compressor housing, in accordance with one or more techniques of this disclosure.

FIGS. 7 and 8 illustrate various outside views of compressor housing 202 that illustrate various outside connections and/or structures for securing compressor housing 202 to other components (e.g., end housing 270) and/or systems (e.g., evaporator 120 and condenser 116 of FIG. 1C). FIG. 7 is an outside view of an example compressor housing 202 (e.g., a main compressor housing 202), in accordance with one or more techniques of this disclosure. In some examples, second portion 208 of compressor housing 202 includes a set of holes 278 on a mating face or plane of second portion 208. In such examples, the mating face is a mating face for end housing 270 (e.g., a cap to the main housing 202). FIG. 8 is an outside view of an example main compressor housing 202, in accordance with one or more techniques of this disclosure. The outside view of FIG. 8 is similar to FIG. 7, but with a rotated perspective such that outlet port 302 is in view from the front.

Figure 9:
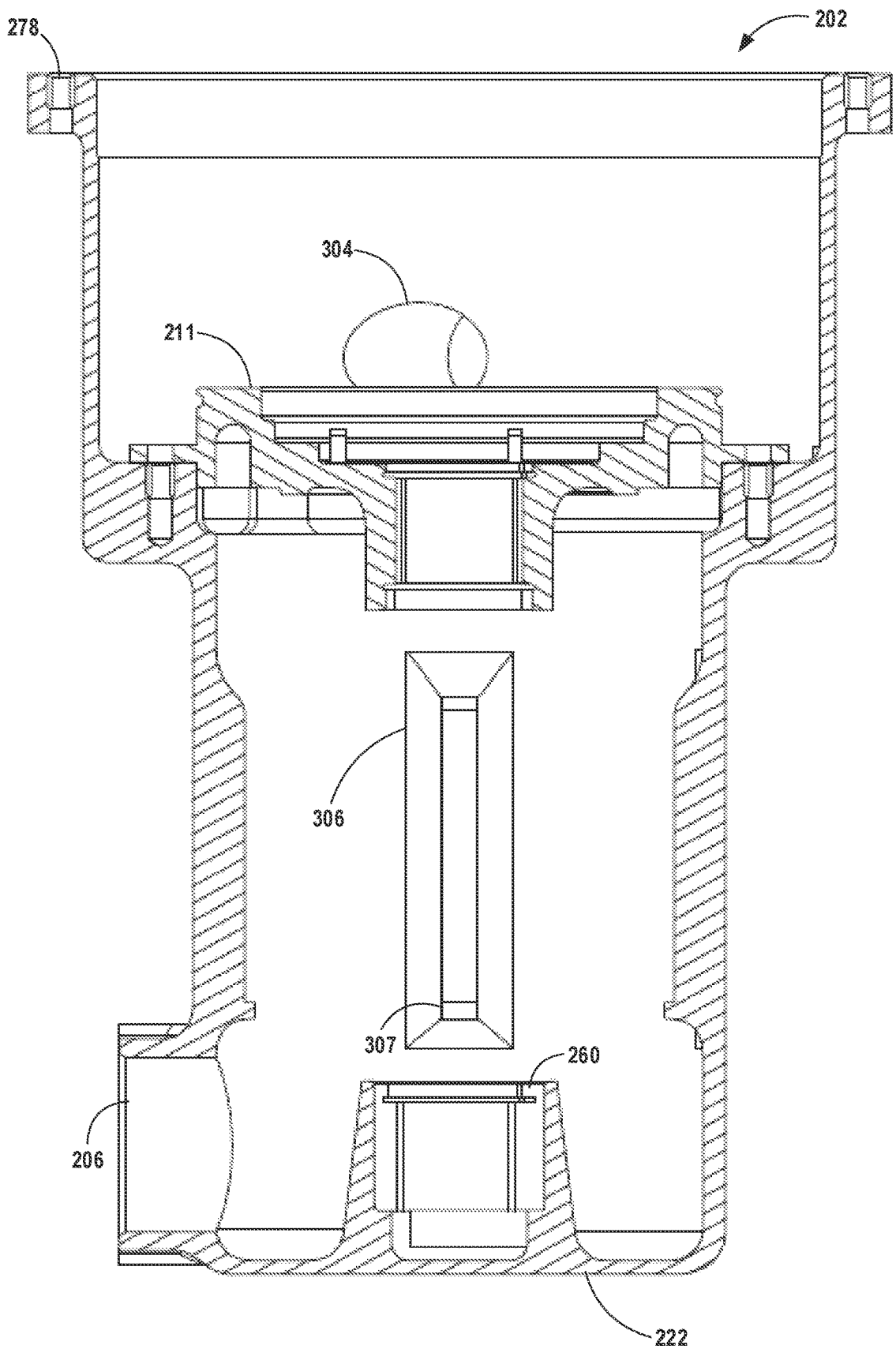
FIG. 9 is a cross-sectional side view diagram illustrating an example main compressor housing having a separation plate, in accordance with one or more techniques of this disclosure.

Compressor housing 202 may include one or more internal housings or structures configured to support compressor motor 207, shaft 220, and/or the impeller assembly (including impellers 213). FIG. 9 is a cross-sectional view of an example main compressor housing 202 having separation plate 211 and a bearing holder 260, in accordance with one or more techniques of this disclosure. Bearing holder 260 may be configured to position and support a proximal (e.g., upstream) portion of shaft 220, while separation plate 211 may be configured to position and support a more distal (e.g., downstream) portion of shaft 220. Each of bearing holder 260 and separation plate 211 may include plurality of journal bearings configured to interface with shaft 220 to rotate within compressor 200.

Figure 10A:
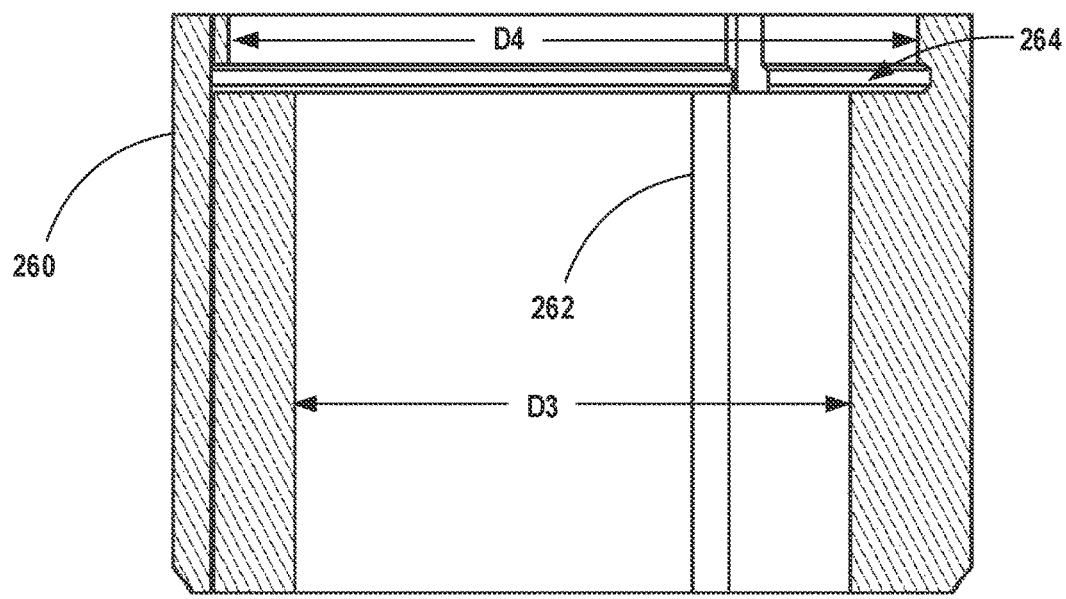
FIG. 10A is a cross-sectional side view diagram illustrating an example bearing holder, in accordance with one or more techniques of this disclosure.
Figure 10B:
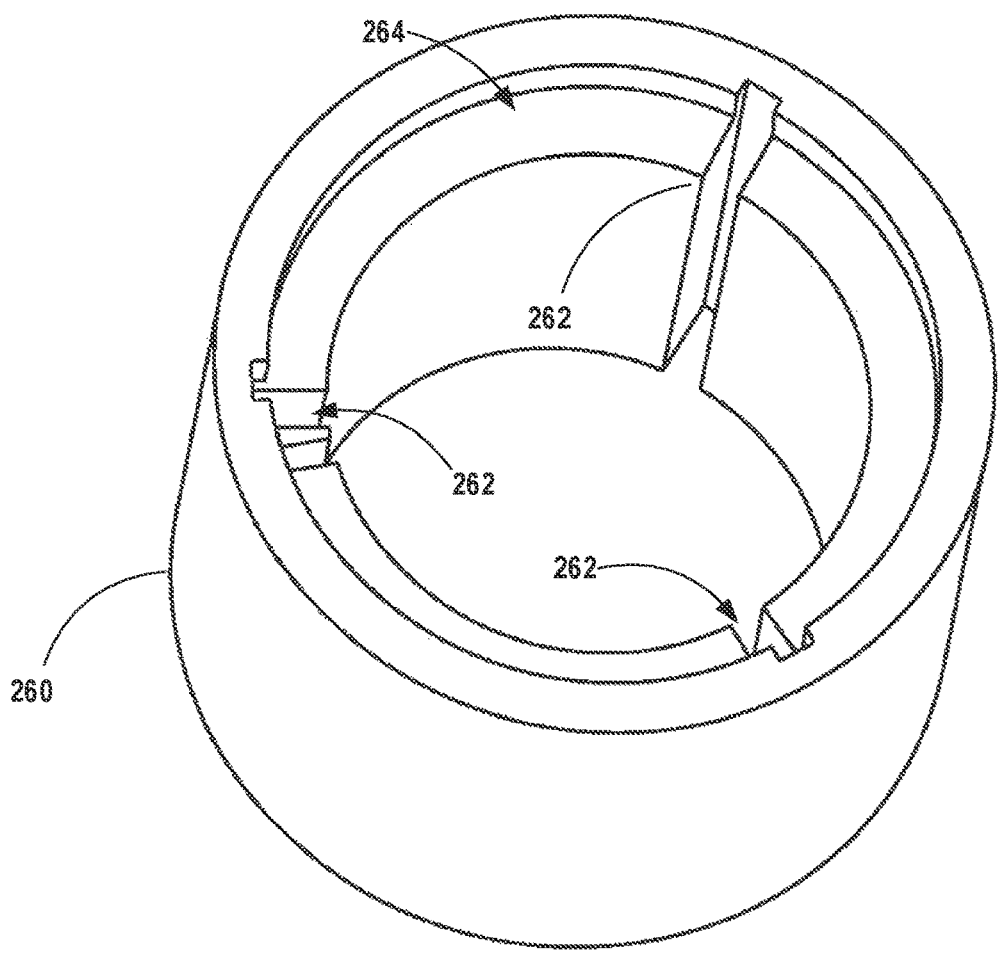
FIG. 10B is a perspective view diagram illustrating an example bearing holder, in accordance with one or more techniques of this disclosure.

FIG. 10 is an example bearing holder 260, in accordance with one or more techniques of this disclosure. Bearing holder 260 may be configured to hold journal bearings. That is, the journal bearings may be disposed within a first journal bearing holder located on a first side (e.g., aft side) of compressor motor 207 and a second journal bearing holder located on a second side of compressor motor 207.

In some examples, the journal bearing holder comprises one or more slots 262. The one or more slots 262 are configured to secure and prevent rotation of the journal bearing foils. In some examples, the journal bearing holder 260 comprises a step configuration 264 that provides various diameters for bearing holder 260. As illustrated diameter D4 is greater than diameter D3. That is, bearing holder 260 includes various widths.

In some examples, the journal bearing holders are configured to hold a set of journal bearings. In some examples, the set of journal bearings include a first journal bearing and a second journal bearing. In such examples, the first journal bearing may comprise a foil bearing. In addition, the second journal bearing may comprise a foil bearing. In such examples, the at least one bearing holder 260 (e.g., at the aft side) or the plurality of bearing holders 260 on both sides of compressor motor 207.

Figure 11:
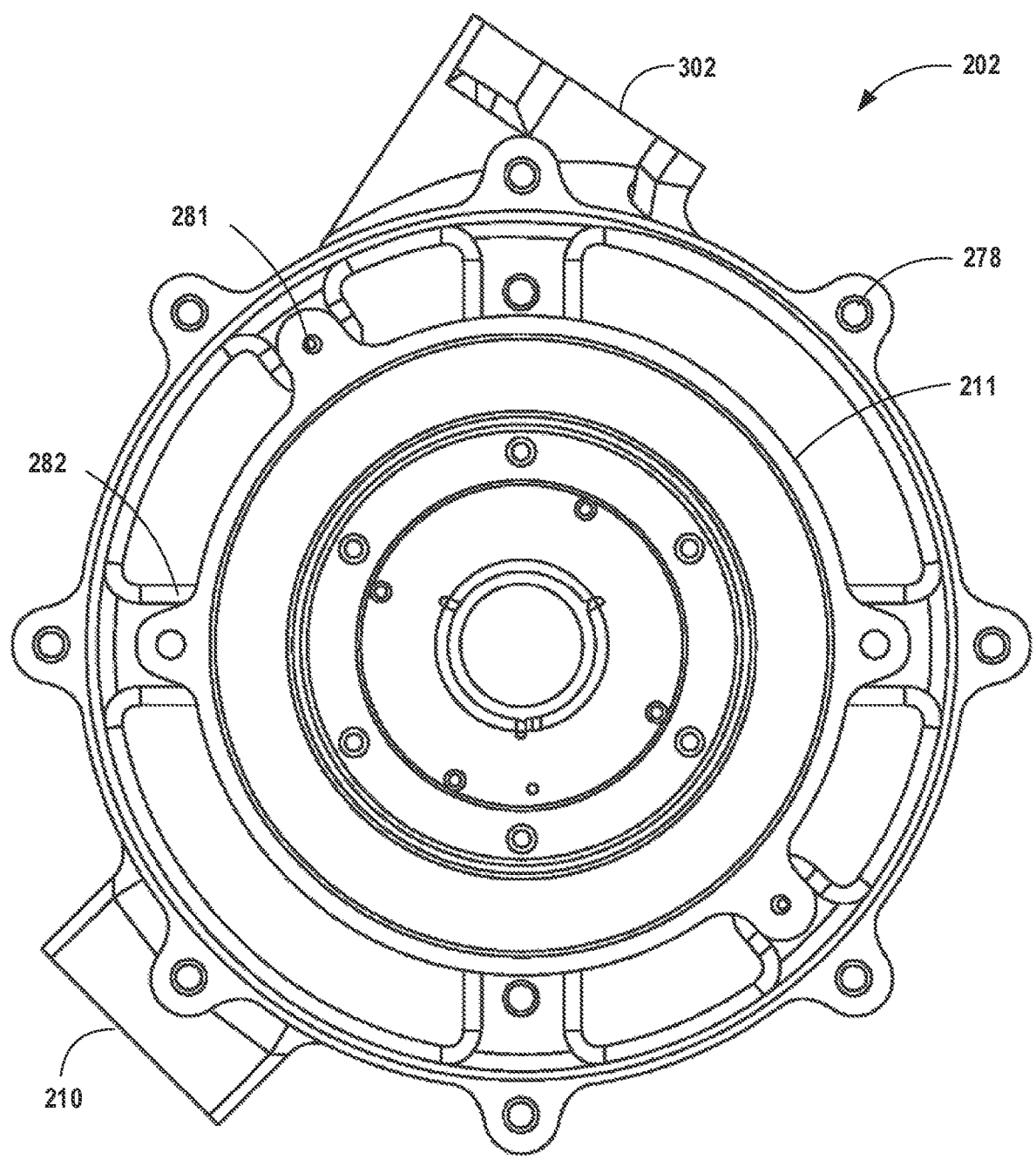
FIG. 11 is a cross-sectional top view diagram illustrating an example main compressor housing and a separation plate, in accordance with one or more techniques of this disclosure.

FIG. 11 is a top view of an example compressor housing 202 and a top view of separation plate 211, in accordance with one or more techniques of this disclosure. Separation plate is shown from the top as after being inserted into second portion 208 of compressor housing 202. In some examples, the mating face of second portion 208 includes holes 278 that extend outward past the diameter of second portion 208, as shown in FIG. 11. In addition, separation plate 211 includes holes 281. In some examples, holes 281 may be spaced unevenly. In some instances, the portion of holes 281 may create ribs on which separation plate 211 may sit.

Figure 12:
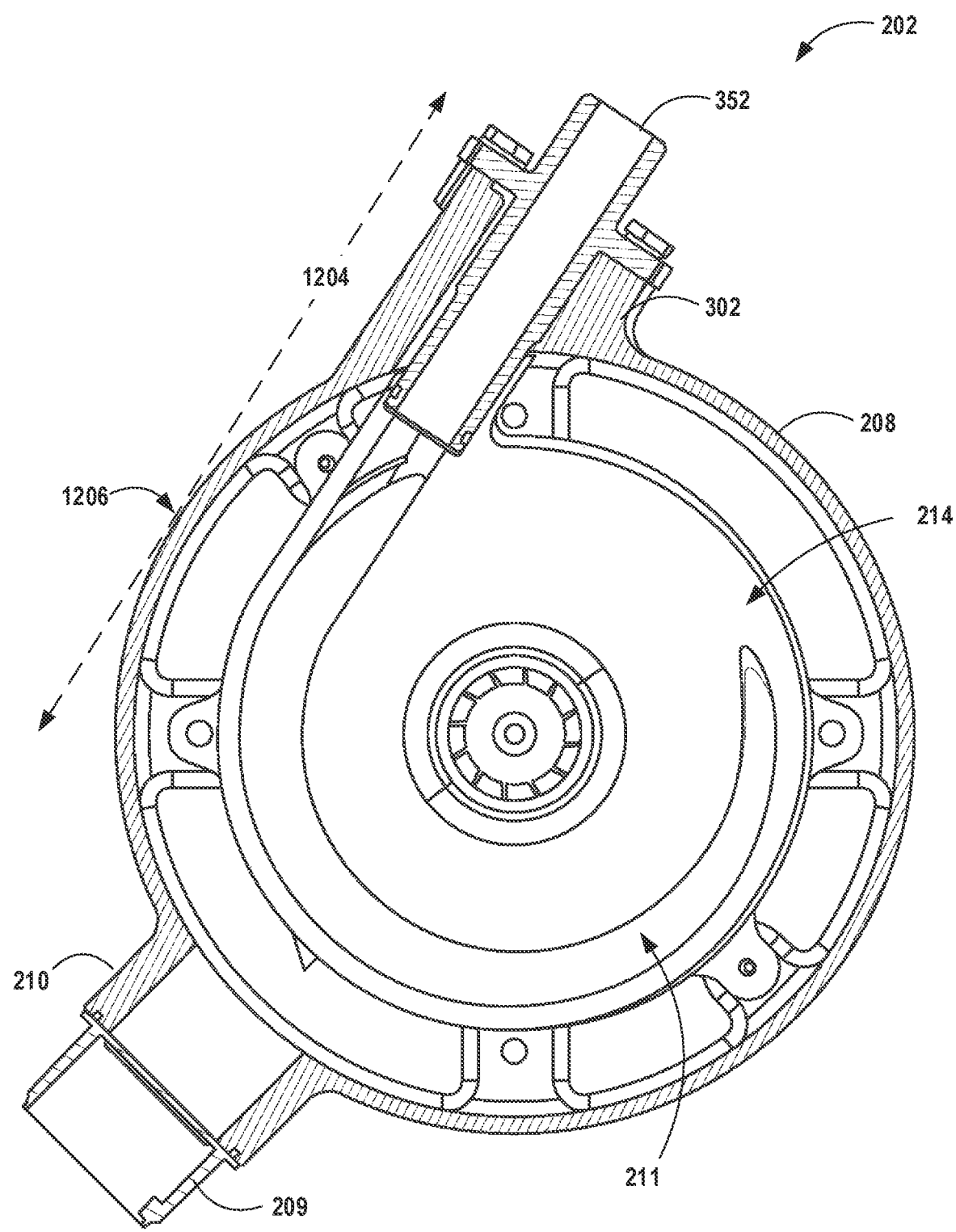
FIG. 12 is a cross-sectional top view diagram illustrating an example main compressor housing, a scroll housing, and a separation plate, in accordance with one or more techniques of this disclosure.

FIG. 12 provides a top view of the compressor housing. As shown in FIG. 2, in some examples, outlet port 302 protrudes from second portion 208 of the compressor housing in a direction substantially tangential relative to a curved surface of second portion 208 of the compressor housing. For example, the outlet port 302 may protrude in such a direction due to the need to take compressed refrigerant from the at least one impeller 213 or in a two-stage compressor, from a second impeller that is downstream from the at least one impeller 213. As shown, a tangent line intersects a lateral surface of second portion 208 of compressor housing 202 at a point 1206. The tangent line extends so as to extend in parallel relative to adapter 352 and/or outlet port 302.

In some examples, second portion 208 of compressor housing 202 includes electrical port 210 that protrudes from the second portion of the compressor housing in a substantially perpendicular direction relative to an outer surface of second portion 208 of compressor housing 202. Electrical port 210 may be configured to receive electrical port attachment 209 (e.g., via bolts, press-fit, etc.). Electrical port 210 may form a hermetic seal with electrical port attachment 209.

Figure 13:
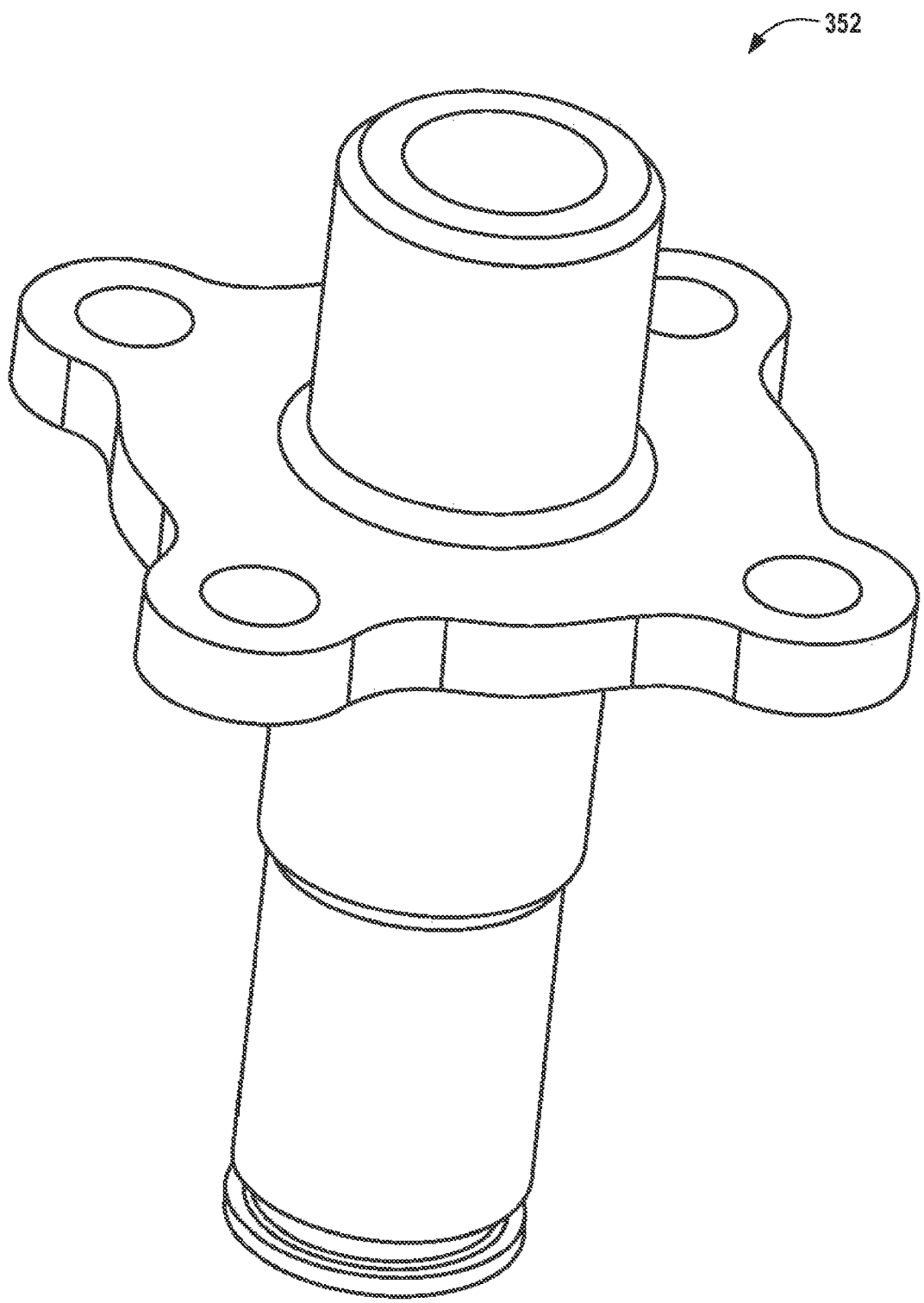
FIG. 13 is a perspective view diagram illustrating an example adapter that inserts into the outlet port of a main compressor housing, in accordance with one or more techniques of this disclosure.

FIG. 13 is a perspective view diagram illustrating an example adapter 352, in accordance with one or more techniques of this disclosure. In some examples, adapter 352 is configured to insert into outlet port 302 of compressor housing 202. That is, outlet port 302 may be configured to receive adapter 352.

Figure 14:
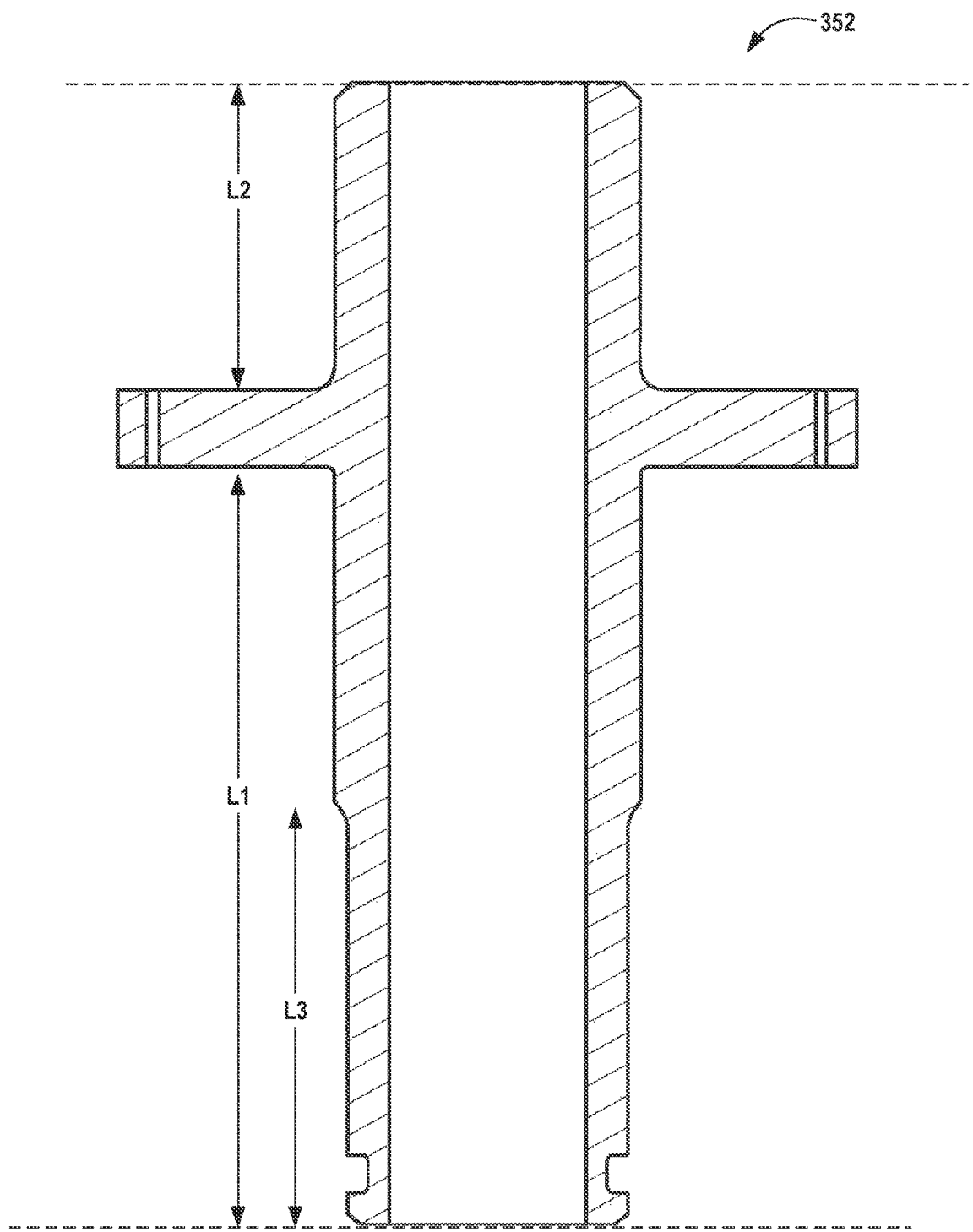
FIG. 14 is a cross-sectional side view diagram illustrating an example adapter, in accordance with one or more techniques of this disclosure.

FIG. 14 is a cross-sectional side view illustrating an example adapter 352, in accordance with one or more techniques of this disclosure. Adapter 352 may have a first length L1 on a side of adapter 352 that enters into outlet port 302. Adapter 352 may have a second length L2 that is on the outside of outlet port 302. In some examples, L1 is greater than L2, as shown. In addition, adapter 352 may include an inner portion that has a length L3. The inner portion may have a groove for receiving a sealing ring. Adapter 352 may include holes that align with holes on compressor housing 202, such that compressor housing 202 may receive adapter 352 and form a hermetic seal with adapter 352. For example, the holes may include threaded cavities through adapter 352 so as to receive bolts.

Figure 15:
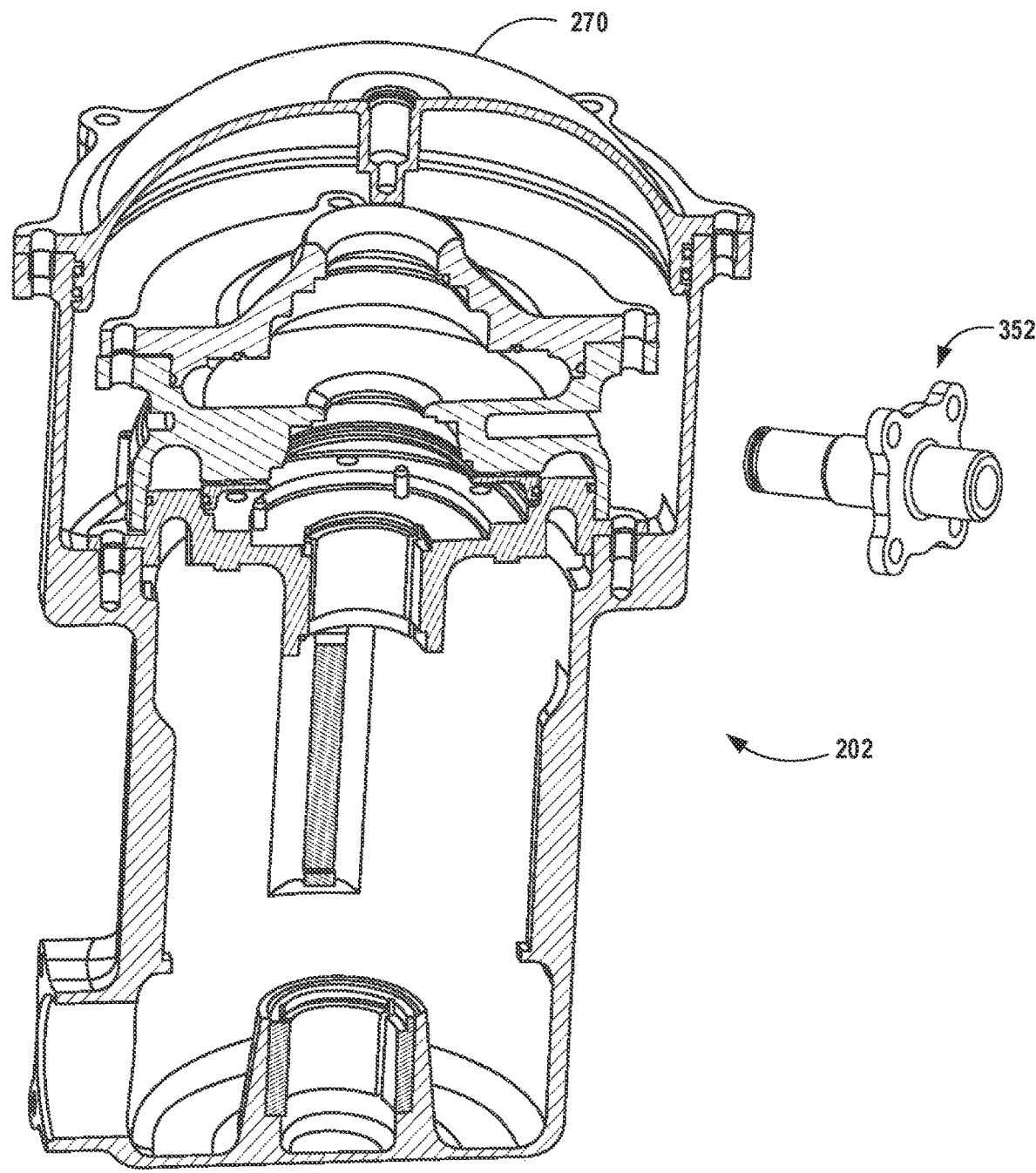
FIG. 15 is a cross-sectional perspective view diagram illustrating certain example components of a compressor enclosed within an end housing and a main compressor housing, in accordance with one or more techniques of this disclosure.

FIG. 15 is a cross-sectional view of certain example components of a compressor 200 enclosed within end housing 270 and compressor housing 202, in accordance with one or more techniques of this disclosure. In some examples, compressor 200 further includes end housing 270 configured to securely attach to second portion 208 of compressor housing 202 and form a hermetic seal between end housing 270 and second portion 208 of compressor housing 202. In addition, adapter 352 may be inserted into outlet port 302 (not shown in FIG. 15). Adapter 352 may have some freedom of movement within outlet port 302 even after being secured within outlet port 302. For example, outlet port 302 may be configured to allow adapter 352 to float within outlet port 302, such that while in operation, adapter 352 may move inward and outward from outlet port 302. In some examples, adapter 352 may float laterally and/or longitudinally.

Figure 16:
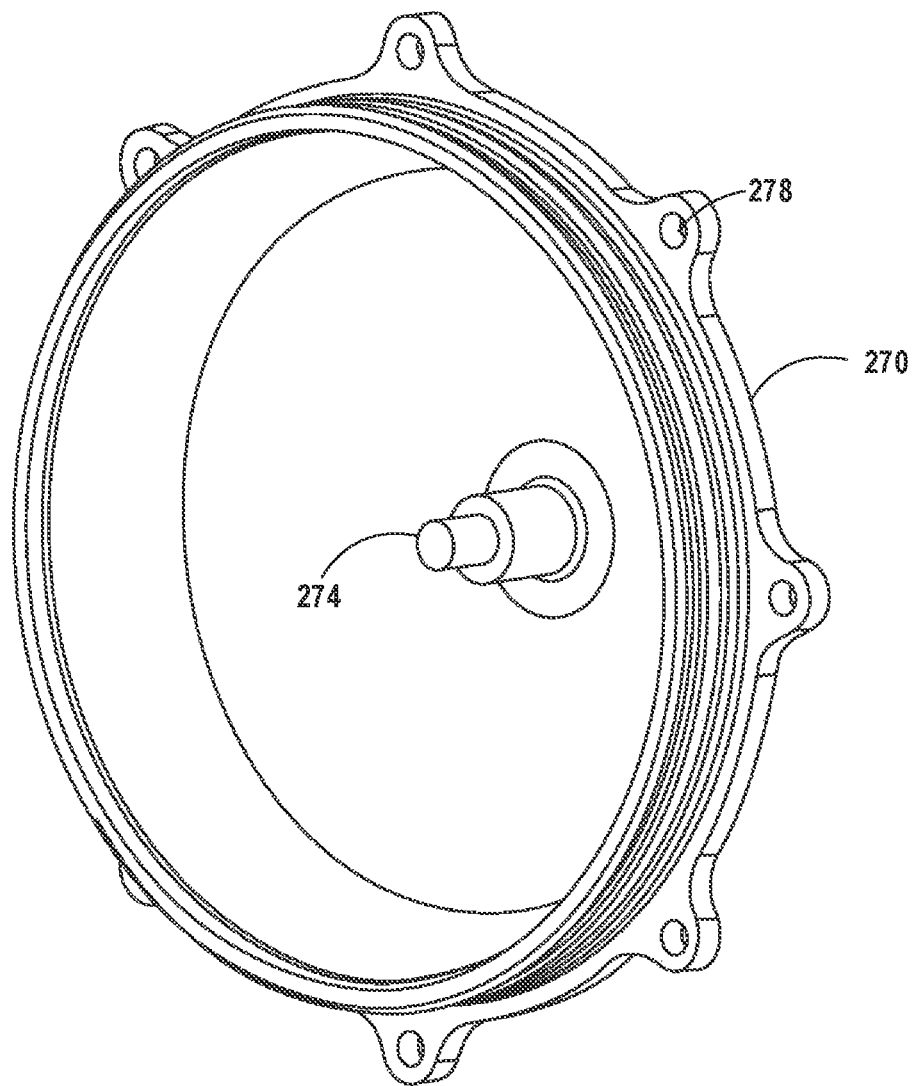
FIG. 16 is a perspective view diagram illustrating an example end housing, in accordance with one or more techniques of this disclosure.

Centrifugal compressors discussed herein may include one or more sensor cavities that extend into a volume of the centrifugal compressor to more accurately measure properties, such as a temperature, of the vapor refrigerant. FIG. 16 is a perspective view of an example end housing 270, in accordance with one or more techniques of this disclosure. In the example shown, end housing 270 includes one or more holes 278 around a circumference of end housing 270. In some examples, at least one of the one or more holes 278 may align with, or mate with, one or more holes 278 of second portion 208. For example, end housing 270 may be attached to second portion 208 by bolts via holes 278 provided in both end housing 270 and second portion 208. In some examples, holes 278 on either of second portion 208 and end housing 270 may be through holes such that both a nut and bolt may be used to attach end housing 270 to second portion 208. In some examples, either holes 278 on second portion or holes 278 on end housing 270 may be threaded and the other of holes 278 on either second portion 208 or end housing 270 are through holes such that a bolt may be passed through a through hole 278 and threaded into the opposing threaded hole to attach end housing 270 to second portion 208, e.g., a bolt having a head, such as a socket head, button head, round head, etc., with a larger diameter than through hole 278.

In the example of FIG. 16, end housing 270 includes sensor cavity 274. In some examples, sensor cavity 274 may form a protrusion within the volume encompassed by end housing 270 and a cavity from the outside of end housing 270. In the example shown, sensor cavity 274 extends within end housing 270 in a direction parallel to the cylindrical axis of second portion 208, such that the outside surfaces of sensor cavity 274 are in communication with the volume encompassed by end housing 270. In some instances, end housing 270 or other parts of the housing may include a sensor cavity 274, in instances where compressor housing 202 includes sensor cavity 274. In addition, the sensor cavity 274 may form a hermetic seal with compressor housing 202 or end housing 270. That is the sensor cavity 274 may be configured to house a sensor (e.g., temperature sensor, pressure sensor, flow rate sensor, etc.), such that the sensor cavity 274 is hermetically sealed with compressor housing 202 or end housing 270.

Figure 17:
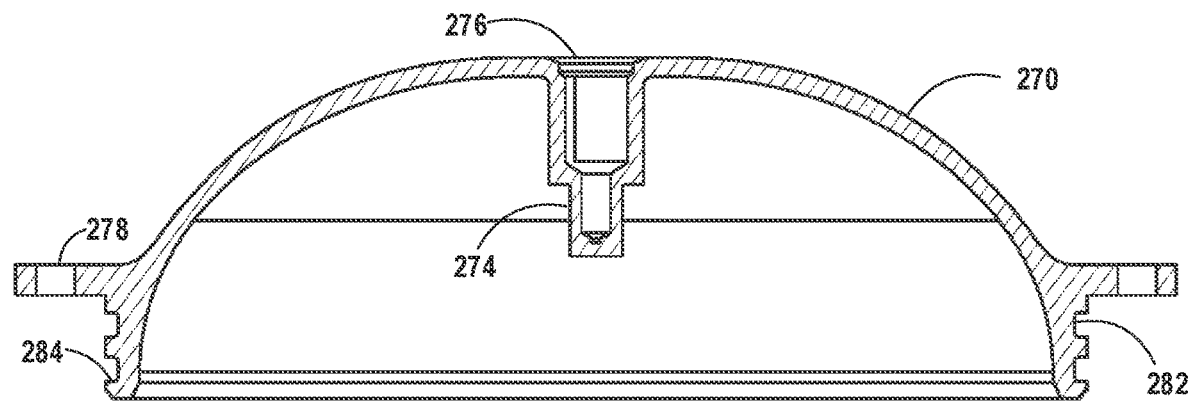
FIG. 17 is a cross-sectional side view diagram illustrating an example end housing, in accordance with one or more techniques of this disclosure.

FIG. 17 is a cross-sectional view of an example end housing 270, in accordance with one or more techniques of this disclosure. In the example shown, end housing 270 includes holes 278, sensor cavity 274, sensor 276, and recesses 282 and 284.

In some examples, sensor cavity 274 may be defined by a sensor cavity wall including a sensor cavity inner surface external to the volume encompassed by end housing 270 and an external cavity surface internal to, and in fluid communication with, the volume encompassed by end housing 270. In the example shown, sensor 276 is disposed within sensor cavity 274. In some examples, sensor 276 may be a temperature sensor, such as a thermistor, thermocouple, RTD, etc. In some examples, temperature sensor 276 is removeable and/or replaceable within sensor cavity 274 such that the sensor can be replaced without having to detach end housing 270 from second portion 208. In some examples, sensor cavity 274 may be configured to mount temperature sensor 276 within sensor cavity 274, e.g., such that temperature sensor 276 may be removably affixed at least partially within sensor cavity 274. At the same time, sensor cavity 274 extends within the volume encompassed by end housing 270 and the outer surfaces of sensor cavity 274 are in communication with the volume encompassed by end housing 270 so as to enable an accurate sensor reading. For example, temperature sensor 276 may be disposed within sensor cavity 274, and thermal energy within the volume encompassed by end housing 270 may be conducted by the outer surfaces of sensor cavity 274 to the inner surfaces of sensor cavity 274 by virtue of the outer surfaces of sensor cavity 274 being in communication with the volume encompassed by end housing 270. Sensor 276 may then generate a temperature measurement that is equal to, or proportional to, the temperature of the volume encompassed by end housing 270. By comparison with a sensor attached to an outer surface of end housing 270, sensor 276 may determine a more accurate temperature of the volume within end housing 270 because of the disposition of the sensor cavity being within the volume encompassed by end housing 270, thereby being in communication with portions of the volume within end housing 270 more central to the volume rather than just at the periphery as is the case with the inner surface of end housing 270 bounding the volume within end housing 270.

In some examples, sensor cavity 274 may enable sensor 276 to reduce any time lag in temperature changes within the volume encompassed by end housing 270. For example, for a given sensor 276 active sensing area, a greater surface area within sensor cavity 274 is in communication with the volume encompassed by end housing 270 as compared with an inner surface of end housing 270. In addition, temperature changes in the volume within end housing 270 will take time to propagate to the inner surface of end housing 270. In some examples, the thickness of the sensor cavity walls may be relatively thin so as to enable a more accurate temperature reading with less delay conduction delay time, while maintaining the structural integrity of sensor cavity 274 with respect to the pressures of the volume encompassed by end housing 270. In an example, the sensor cavity wall may be thinner than the end housing wall. By incorporating a thin walled sensor cavity 274 that protrudes into the volume, sensor 276 may more accurately and/or quickly reflect a temperature of vapor refrigerant within the volume.

In some examples, sensor cavity 274 may extend into the volume encompassed by end housing 270, such that sensor cavity 274 may be proximate to an inlet of an impeller assembly, such as opening 215 of inlet housing 212 illustrated in FIG. 3. For example, referring to FIG. 3, flow of vapor refrigerant may be relatively slow near end housing 270, such that the vapor refrigerant may be relatively stagnant in these regions. As such, properties of the vapor refrigerant in these relatively stagnant regions may not accurately represent properties of the vapor refrigerant entering opening 215. By positioning sensor cavity 274 near opening 215, sensor 276 may measure a temperature of vapor refrigerant near entry of the vapor refrigerant entering opening 215.

In some examples, a temperature measured from sensor cavity 274 may be used to control a superheat of vapor refrigerant entering opening 215. For example, if a temperature sensor measures a temperature of the vapor refrigerant that decreases below a particular superheat threshold, the temperature sensor may output a temperature measurement that is configured to cause a downstream expansion valve to close. Closing the expansion valve may, among other things, restrict flow of the refrigerant through the system, thereby reducing a mass flow rate of refrigerant into compressor 200 and/or lowering a pressure of refrigerant into compressor 200. The restricted flow and/or reduced pressure may, in turn, cause an increase in temperature (e.g., of the vapor refrigerant) at the opening 215, such that the vapor refrigerant may enter the inlet housing at or above a particular superheat temperature.

In some examples, the restricted flow and/or reduced pressure may cause an increase in temperature of the vapor refrigerant at the opening 215 via allowing more heat to transfer from the compressor motor. In other words, the compressor motor may be a source of heat that may be used to control superheat of vapor refrigerant at opening 215, and the superheat may be controlled via control of the mass flow rate of the vapor refrigerant into compressor 200 and flowing along flow path 250. Temperature sensor 276 disposed within sensor cavity 274 may measure an accurate temperature of vapor refrigerant near opening 215 and feedback from temperature sensor 276 may be used for closed-loop control superheat at opening 215 and to ensure that substantially all of the vapor refrigerant is gas, and substantially none of vapor refrigerant is liquid, at opening 215 and thereby reducing and/or eliminating impingement of refrigerant on impeller 213. In some examples, the superheat threshold, e.g., for superheat control, may be a temperature greater than the saturation temperature of the vapor refrigerant. For example, the superheat threshold may be at least one degree Celsius greater than the saturation temperature of the vapor refrigerant, at least two degrees Celsius above the saturation temperature of the vapor refrigerant, at least five degrees Celsius above the saturation temperature of the vapor refrigerant, at least ten degrees Celsius above the saturation temperature of the vapor refrigerant, at least fifteen degrees Celsius above the saturation temperature of the vapor refrigerant, or any other temperature greater than the saturation temperature of the vapor refrigerant.

In some examples, end housing 270 may include a domed shape, as shown. For example, a domed shape may improve a structural integrity of end housing 270 by resisting deformation caused by high or low pressures experienced within compressor 200. In some examples, end housing 270 may include features, e.g., mechanical vanes and/or other structures, that help guide the vapor toward the inlet housing 212.

Figure 18:
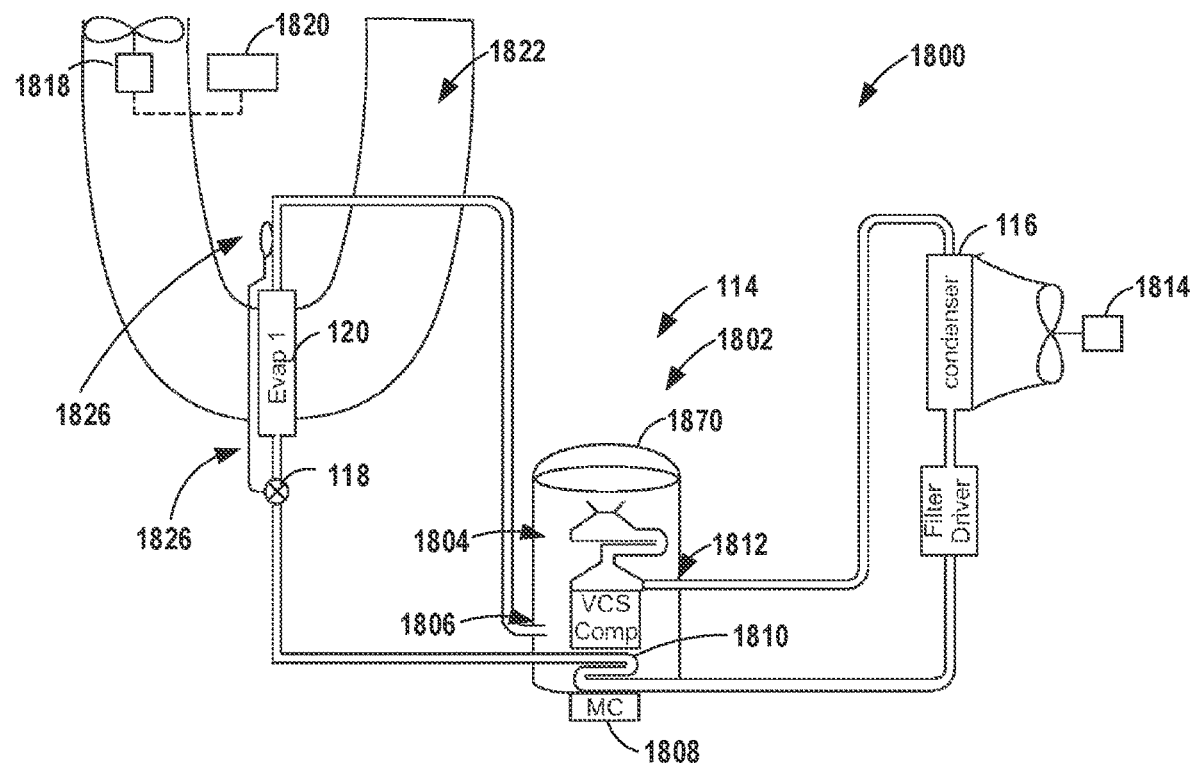
FIG. 18 is a block diagram illustrating an example vapor cooling system that employs compressed refrigerant, in accordance with one or more techniques of this disclosure.

Compressors described herein may be used with a low-pressure refrigerant, such as to provide a reduced cooling capacity. FIG. 18 is a schematic diagram of an example system 1800 that employs a low-pressure refrigerant, in accordance with one or more techniques of this disclosure. Operation of system 1800 may be substantially similar to operation of VCS 108, illustrated and described with respect to FIG. 1 above. In the example shown, system 1800 includes vapor cycle compressor (VCC) 114, condenser 116, expansion device 118, and evaporator 120 fluidically coupled to each other through pressurized refrigerant supply lines to form a refrigerant circuit.

VCC 114 may be configured to receive vapor refrigerant from evaporator 120 and compress and pump vapor refrigerant to condenser 116, as described above with respect to FIG. 1. In some examples, VCC 114 may be a centrifugal compressor that compresses vapor refrigerant via an increase in pressure by an electrically driven impeller. VCC 114 may be an example of centrifugal compressor 200 described and illustrated above with respect to FIGS. 2-17. For example, VCC 114 may include a compressor housing 1802 having first portion 1804 and end housing 1870. In some examples, compressor housing 1802 is an example of compressor housing 202. First portion 1804 may be configured to include an inlet port 1806, a motor controller 1808, a motor controller cooling section, and outlet port 1812. VCC 114 may be configured to compress a low-pressure refrigerant, as further described below.

In some examples, a flow path is formed between a compressor motor and compressor housing 1802. That is, compressor motor and the compressor housing 1802 define a flow path through which vapor refrigerant flows. The vapor refrigerant washes over the compressor motor to remove heat from the compressor motor and other components of VCC 114. In some examples, the vapor refrigerant gas is superheated (e.g., in a substantially gaseous state) when entering inlet port 1806 of compressor housing 1802 and when ingested by the at least one impeller.

In some examples, the temperature of the vapor refrigerant and/or a vapor fraction of the vapor refrigerant may be lower at one end of compressor housing 1802 near inlet port 1806 relative to the temperature of the refrigerant gas entering the opening of the inlet housing (e.g., inlet housing 212) of the at least one impeller. For example, vapor refrigerant may absorb heat from various components of VCC 114, such as the compressor motor, shaft bearings, and/or compressor housing adjacent the motor controller, as the vapor refrigerant washes over the various components, such as described in FIG. 2 above.

In some examples, the compressor motor is configured to interface with (e.g., be immersed in) refrigerant as the refrigerant flows from the inlet port 1806 of the compressor housing to the opening of the inlet housing (e.g., inlet housing 212). In some examples, a conduit 1810 of refrigerant tubing is interposed between motor controller 1808 and the compressor motor. Conduit 1810 may include a heat exchanger. As such, conduit 1810 may be configured to transport refrigerant from a condenser to an evaporator.

In some examples, compressor 200 may include a motor controller 1808 configured to control compressor motor 207.

In some examples, motor controller 1808 includes an electrical feedback loop configured to enable variable speed control of compressor motor 207. In some examples, motor controller 1808 is a silicon carbide (SiC) motor controller.

In some examples, the first portion 204 of the compressor housing comprises an attachment surface configured to securely attach a motor controller to the first portion 204 of the compressor housing. In some examples, the first portion 204 of the compressor housing includes heat sink fins disposed within the confines of the first portion 204 of compressor housing 202. The heat sink fins are configured to dissipate heat generated by motor controller 1808 into compressor housing 202. In some examples, the heat sink fins may be configured to heat coolant in accumulator 224.

In some examples, compressor housing 202 includes aft surface 222 configured to provide a surface for mounting the motor controller 1808. In such examples, aft surface 222 may be substantially perpendicular to a direction of the shaft 220 that is extending in an axial direction relative to compressor motor 207.

In some examples, first portion 204 of compressor housing 202 includes a conduit 1810 through first portion 204. Conduit 1810 may be interposed between an end having cavity 312 and an additional end that faces both the opening and the end having the cavity 312 (e.g., in the upward direction of FIG. 18). In such examples, motor controller 1808 is secured to a flat surface of the additional end. Otherwise goes on a side of the first end that is opposite a side facing the opening. In some examples, conduit 1810 may route around cavity 312, such that no additional end is used to house conduit 1810 and thereby separate the conduit from cavity 312. In any case, the conduit 1810 may be configured to absorb heat generated by motor controller 1808 and carry the heat to an expansion device 118.

Condenser 116 may be configured to be cooled by environmental air. In some examples, system 1800 may include fan 1814 to create an air flow to cool the vaporized refrigerant in condenser 116. In other examples, condenser 116 may be cooled by ram air flow or fuel or other heat transfer fluid.

In some examples, condensed/cooled refrigerant may flow through a motor controller cooling section. For example, motor controller cooling section may include a conduit 1810. For example, conduit 1810 may include a serpentine routing of the refrigerant within system 1800 after condensed/cooled refrigerant flows from condenser 116 and proximal to motor controller 1808. In some examples, system 1800 may be configured to cool motor controller 1808 without the motor controller cooling section, and in other examples, system 1800 may not include cooling of motor controller 1808.

Expansion device 118 may be configured to reduce a pressure of saturated refrigerant prior to entry into evaporator 120. In some examples, expansion device 118 may include feedback 1826. Feedback 1826 may include a temperature and/or pressure sensor 1828 configured to measure the temperature and/or pressure of refrigerant after exiting evaporator 120. In some examples, the expansion device 118 may reduce the pressure of saturated refrigerant at least partially determined based on the temperature and/or pressure measured via feedback 1826.

Evaporator 120 may be configured to receive air of a volume for which the air is to be conditioned and remove heat from that air using the refrigerant and discharge the air into the volume. In some examples, evaporator 120 may be in communication with air of the volume directly within the volume, or in other examples via an air conduit system, e.g., ductwork. In some examples, evaporator 120 may be in communication with air of the volume via an air pressurization system. In the example shown, system 1800 may include fan 1818 to create an air flow in communication with evaporator 120 to cool the air by transfer of heat to the refrigerant.

In some examples, system 1800 may include a filter-drier (not shown in FIG. 18). The filter-drier may be downstream of condenser 116 and upstream of evaporator 120. In examples including conduit 1810, the filter-drier may be downstream of conduit 1810 (e.g., downstream of a motor controller heat exchanger). In some examples, a filter-drier may be downstream of condenser 116 and upstream of conduit 1810.

In some examples, system 1800 may use a low-pressure refrigerant. For example, system 1800 may use a refrigerant with a vapor density of less than 15 kg/m$^3$ at 25° C. In some examples, system 1800 may use a low-pressure refrigerant that is additionally non-ozone depleting, non-toxic, non-flammable, and has an ultra-low global warming potential (GWP). For example, system 1800 may use such a low-pressure refrigerant having a GWP of less than 150, or of less than 50, or of less than 10, or of less than 5, or of less than about 1. In some examples, system 1800 may use R-1233zd or similar low-pressure refrigerants.

In some examples, system 1800 may be a low capacity cooling system. For example, system 1800 may have a cooling capacity of less than 25 kilowatts (kW), or of less than 20 kW, or of less than 15 kW. In some examples, the use of a low-pressure refrigerant and enables system 1800 to reduce weight and size relative to a vapor cooling system that does not use a low-pressure refrigerant. For example, scaling down the components of a vapor cooling system, such as the compressor, to reduce the cooling capacity for applications that require a lower cooling capacity becomes difficult and prohibitively inefficient when non-low pressure refrigerants are used. Reducing the cooling capacity requires a reduction in the mass flow of the refrigerant in at least the compressor, which in turn requires a reduction in the ports and tubes distributing the refrigerant within the compressor to sizes at which the system becomes prohibitively inefficient. In some examples, use of a low pressure refrigerant in system 1800 enables a reduced mass flow, thereby enabling larger relative ports and tubes in a relatively scaled down compressor, thereby enabling sufficient system efficiency. In some examples, the use of a low pressure refrigerant enables a reduction of the size and/or weight of system 1800.

Figure 19:
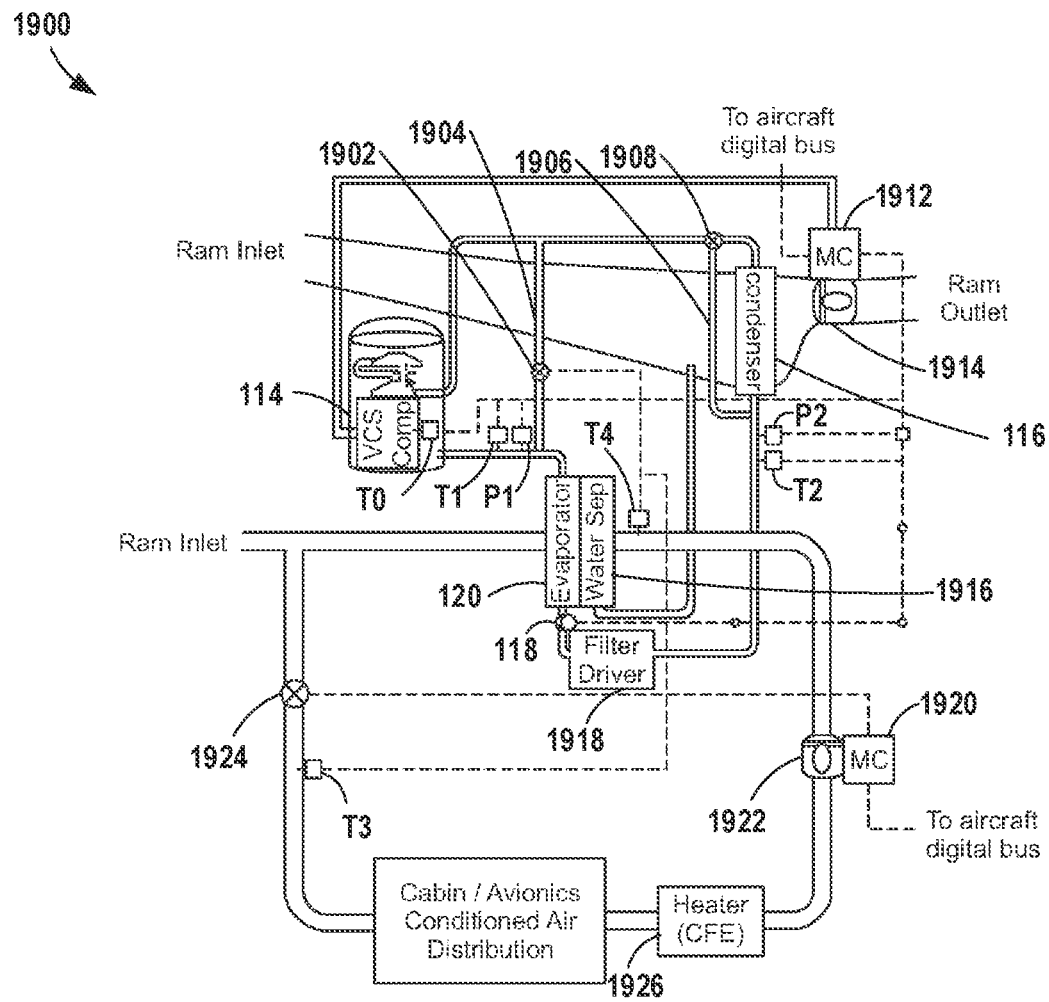
FIG. 19 is a block diagram illustrating an example vapor cooling system that employs compressed refrigerant, in accordance with one or more techniques of this disclosure.

FIG. 19 is a schematic diagram of an example system 1900 that employs a low pressure refrigerant, in accordance with one or more techniques of this disclosure. System 1900 may be similar to VCS 108, illustrated and described with respect to FIG. 1 above. In the example shown, system 1900 includes VCC 114, condenser 116, expansion device 118, and evaporator 120 fluidically coupled to each other through pressurized refrigerant supply lines to form a refrigerant circuit. In the example shown, system 1900 also includes an air path for air used to transfer heat from the refrigerant externally from system 1900 and an air path for conditioned air.

VCC 114 may be configured to receive vapor refrigerant from evaporator 120 and compress and pump vapor refrigerant to condenser 116, as described above with respect to FIG. 1. In some examples, VCC 114 may be a centrifugal compressor that compresses vapor refrigerant via an increase in pressure by an electrically driven impeller. VCC 114 may be an example of centrifugal compressor 200 described and illustrated above with respect to FIGS. 2-17.

In some examples, VCC 114 may include temperature sensor T0 within the housing of VCC 114 configured to measure the temperature of vaporized refrigerant before compression.

System 1900 may include surge paths 1902, 1906 and surge control valves 1904, 1908. For example, surge control valves 1904, 1908 may be configured to prevent backflow within VCC 114, condenser 116, or other components of system 1900. In some examples, the surge control valves 1904, 1908 may be configured to prevent a surge event from occurring within the compressor.

Condenser 116 may be configured to be cooled by environmental air. In some examples, system 1900 may include fan 1914 to create an air flow to cool the vaporized refrigerant in condenser 116. In other examples, condenser 116 may be cooled by ram air flow. In the example shown, fan 1914 may be configured to be controlled by motor controller 1912 and function in combination with ram air flow to regulate the flow of air across condenser 116. In the example shown, motor controller 1912 may be connected to the digital bus of a vehicle on which system 1900 is utilized, e.g., an aircraft, watercraft, ground vehicle, etc.

System 1900 may include filter-drier 1918. For example, filter-drier 1918 may be configured to catch any particulate matter and moisture that may have contaminated the refrigerant. In some examples, system 1900 may include water separator 1916 configured to collect and remove water from evaporator 120, e.g., to remove condensation from conditioned air.

System 1900 may include one or more temperature and pressure sensors. In the example shown, system 1900 includes temperature sensor T1 and pressure sensor P1 to measure the temperature and pressure of vaporized refrigerant prior to the inlet of VCC 114. System 1900 may also include temperature sensor T2 and pressure sensor P2 to measure the temperature and pressure of saturated refrigerant from condenser 116. Temperature sensors T1, T2 and pressure sensors P1, P2 may be connected to the digital bus of a vehicle on which system 1900 is utilized, e.g., an aircraft, and may communicate temperature and pressure measurements to a computing system and/or processing circuitry configured to control system 1900.

Evaporator 120 may be configured to receive air, for example, from a ram inlet, and remove heat from that air using the refrigerant. In some examples, system 1900 may be configured to cool, heat, and control the air flow of conditioned air. For example, system 1900 may include fan 1920, motor controller 1922 and air valve 1924 configured to control the flow of air cooled by evaporator 120 and heated by heater 1926. System 1900 may also include temperature sensor T3 configured to measure the temperature of conditioned air after heater 1926. In the example shown, motor controller 1922, air valve 1924, heater 1926, and temperature sensors T3, T4 may be connected to the digital bus of a vehicle on which system 1900 is utilized, e.g., an aircraft. In some examples, conditioned air may be re-cycled, that is, reintroduced into the ram inlet for further cooling and heating, as controlled by air valve 1924.

In some examples, system 1900 may use a low pressure refrigerant. For example, system 1900 may use a refrigerant with a vapor density of less than 15 kg/m$^3$ at 25° C. In some examples, system 1900 may use a low pressure refrigerant that is additionally non-ozone depleting, non-toxic, non-flammable, and has an ultra-low global warming potential (GWP). For example, system 1900 may use such a low pressure refrigerant having a GWP of less than 150, or of less than 50, or of less than 10, or of less than 5, or of less than about 1. In some examples, system 1900 may use R-1233zd or similar low-pressure refrigerant.

In some examples, system 1900 may be a low capacity cooling system. For example, system 1800 may have a cooling capacity of less than 25 kilowatts (kW), or of less than 20 kW, or of less than 15 kW. In some examples, the use of a low pressure refrigerant and enables system 1900 to reduce weight and size relative to a vapor cooling system that does not use a low pressure refrigerant.

A method of manufacturing a centrifugal compressor system is disclosed. The method comprises placing a compressor in a compressor housing. For example, the method comprises placing compressor 200 in compressor housing 202, where compressor 200 and compressor housing 202 are manufactured and/or assembled according to the various techniques of this disclosure. The method further comprises placing an end housing (e.g., top, cap, etc.) over the compressor housing. In some examples, the method further comprises bolting the end housing to the compressor housing. In some examples, the method further comprises creating a hermetic seal between the end housing and the compressor housing.

A method of providing maintenance to centrifugal compressor 200 is disclosed, the method comprising removing a first plurality of bolts that connect an end housing of the centrifugal compressor system to a main housing 202 of the centrifugal compressor 200. For example, the method comprises placing the compressor motor and impeller assembly in the compressor housing as those aspects are described herein. In addition, the method comprises removing a second plurality of bolts that are used to secure separation plate 211 to compressor housing 202. The method further comprises removing, through opening 279, one or more impellers of the at least one impeller 213 and separation plate 211.

In some examples, a vapor cooling system (VCS) is disclosed, the VCS comprising: an evaporator configured to receive the supply air from an air pressurization system (APS) and cool the supply air using a low-pressure refrigerant; a condenser configured to cool the low-pressure refrigerant using environmental air; and a vapor cycle compressor (VCC) configured to discharge the low-pressure refrigerant, in accordance with one or more techniques of this disclosure. The VCC may be a compressor according to any one of the examples disclosed herein.

In some examples, a method is disclosed for: cooling, by an evaporator, pressurized supply from an air pressurization system (APS) of a vehicle (e.g., an aircraft, watercraft, spacecraft, etc.) using a vapor refrigerant; cooling, by a condenser, the refrigerant using environmental air; and discharging, by a VCC, compressed vapor refrigerant. The VCC may be a compressor according to any one of the examples disclosed herein.

Illustrative examples of the disclosure include:

Example 1: A compressor housing of a centrifugal compressor, the compressor housing configured to house a compressor motor, an inlet housing, and a separation plate that is interposed between the compressor motor and the inlet housing, the compressor housing comprising: a first portion configured to house the compressor motor, wherein the first portion includes a refrigerant inlet port configured to route incoming vapor into the first portion, wherein the incoming vapor, when flowing through the first portion, is configured to cool the compressor motor; and a second portion configured to house the separation plate, the scroll housing, and the inlet housing, wherein the second portion includes an outlet port configured to flow the refrigerant (e.g., compressed vapor) from the compressor housing (e.g., to an outside of the compressor housing), wherein the compressor housing is configured to allow the refrigerant to flow through the first portion to the second portion, and, when flowing to the second portion, to pass by the outlet port before the refrigerant routes to an opening of the inlet housing.

Example 2: A compressor housing, comprising: a first portion configured to house a compressor motor, wherein the first portion includes a refrigerant inlet port configured to receive vapor refrigerant; and a second portion configured to house or engage a separation plate, wherein the second portion includes an outlet port configured to discharge vapor refrigerant from the compressor housing, wherein the compressor housing defines a primary flow path for vapor refrigerant to enter the refrigerant inlet port, wherein the primary flow path extends through the first portion of the compressor housing and into the second portion of the compressor housing, wherein the primary flow path initially passes by the outlet port and routes around an inner surface of the second portion of the compressor housing.

Example 3: A compressor housing according to any of Examples 1 or 2, wherein the compressor housing comprises a first bearing holder cavity at a first end, and wherein the separation plate comprises a second bearing holder cavity. In some examples, the first bearing holder cavity includes a first bearing holder. Likewise, in some examples, the second bearing holder cavity includes a second bearing holder. In some examples, the compressor housing may include the first bearing holder as an integral feature of the compressor housing. In some examples, the separation plate includes the second bearing holder as an integral feature of the separation plate. In some examples, the second bearing holder may be integrated onto a side of the separation plate that faces the compressor motor (e.g., a motor-facing side). In some examples, the second bearing holder may extend through the separation plate so as to form a cavity therethrough.

Example 4: A centrifugal compressor system comprising the centrifugal compressor and the compressor housing according to any of Examples 1 through 3, wherein the centrifugal compressor comprises: the compressor motor configured to rotate on a journal bearing, wherein the refrigerant is configured to flow through the compressor motor; the separation plate configured to engage with the compressor housing, wherein the refrigerant is configured to flow through and/or around the separation plate; the inlet housing comprising the opening that allows refrigerant to enter the inlet housing; and at least one impeller, wherein the centrifugal compressor is configured to be encased within the compressor housing (e.g., by an end housing or end cap).

Example 5: A centrifugal compressor system according to Example 4, comprising an impeller assembly, the impeller assembly including the at least one impeller and the inlet housing.

Example 6: A centrifugal compressor system according to any of Examples 4 or 5, wherein the separation plate is configured to separate the impeller assembly from the compressor motor. In some examples, the separation plate is configured to house the at least one impeller. For example, the separation plate may house the at least one impeller on a second side of the separation plate that faces the impeller assembly, the second side being an opposite side of the motor-facing side.

Example 7: A centrifugal compressor system according to any of Examples 4 through 6, wherein the centrifugal compressor system includes a two-stage compressor, and wherein at least one impeller includes a first impeller and a second impeller, and wherein the centrifugal compressor system further includes a scroll housing interposed between the first impeller and the second impeller. In some examples, the impeller assembly includes the scroll housing.

Example 8: A centrifugal compressor system according to Example 7, wherein the second portion of the compressor housing is configured to encase (e.g., enclose) the scroll housing.

Example 9: A centrifugal compressor system according to any of Examples 4 through 8, the centrifugal compressor system including a flow path for the refrigerant to flow from the inlet port (e.g., a refrigerant inlet port) of the compressor housing to the outlet port (e.g., a refrigerant outlet port) of the compressor housing.

Example 10: A centrifugal compressor system according to any of Examples 4 through 9, wherein the compressor housing is configured to flow the refrigerant: (i) through the inlet port of the compressor housing, (ii) through the compressor motor (e.g., over the stators), (iii) around the outlet port, (iv) around the inlet housing, and (v) to the opening of the inlet housing. In some examples, the compressor housing is further configured to flow vapor refrigerant across an outer surface of the impeller assembly before the vapor refrigerant enters the inlet housing. Within the inlet housing, the vapor refrigerant may be compressed (e.g., by the centrifugal action of spinning impeller(s)). In addition, the compressor housing may be further configured to discharge, via the outlet port, compressed refrigerant from the impeller assembly.

Example 11: A compressor housing of a centrifugal compressor, the compressor housing configured to house a compressor motor and an inlet housing, the compressor housing comprising: a first portion configured to house the compressor motor, wherein the first portion includes a refrigerant inlet port; a second portion configured to house the inlet housing, wherein the second portion includes an outlet port configured to flow the refrigerant to an outside of the compressor housing; and at least one refrigerant accumulator upstream of the second portion, wherein the at least one refrigerant accumulator is configured to accumulate refrigerant within the compressor housing of the centrifugal compressor.

Example 12: A centrifugal compressor comprising at least one refrigerant accumulator, the at least one refrigerant accumulator configured to accumulate refrigerant within a compressor housing of the centrifugal compressor, wherein the compressor housing is configured to encase a vapor-cooled compressor motor within a first area of the compressor housing, and wherein a second area of the compressor motor includes the at least one refrigerant accumulator, wherein the second area is upstream of the first area.

Example 13: A centrifugal compressor according to any of Examples 11 or 12, wherein the compressor housing and/or centrifugal compressor also comprises a compressor housing and/or a centrifugal compressor according to any one of Examples 1 through 10.

Example 14: A compressor housing of a centrifugal compressor, the compressor housing comprising: a main housing portion, wherein the main housing includes an outlet port configured to discharge compressed vapor refrigerant; and a separate end housing portion, wherein the main housing portion and the end housing portion are configured to interface at a mating surface of the respective housing portions, wherein the mating surface of the respective housing portions is configured to provide a hermetically sealable surface between the main housing portion and the end housing portion, and wherein the outlet port is configured to receive an adaptor from outside of the compressor housing.

Example 15: A compressor housing of a centrifugal compressor, the compressor housing comprising a main housing portion and a separate end housing portion, wherein the main housing portion and the end housing portion are configured to interface at a mating surface of the respective housing portions, and wherein the mating surface is configured to provide a hermetically sealable surface between the main housing portion and the end housing portion, and wherein the main housing includes an outlet port configured to discharge compressed vapor refrigerant, wherein the outlet port is configured to receive an adaptor from outside of the compressor housing.

Example 16: A compressor housing according to any of Examples 14 or 15, wherein the compressor housing also comprises a compressor housing according to any one of Examples 1 through 13.

Example 17: A compressor housing of a centrifugal compressor, the compressor housing comprising: a main housing portion configured to house a compressor motor and an inlet housing, wherein the inlet housing is configured to receive vapor refrigerant downstream of the compressor motor; and an end housing portion, wherein the main housing portion and the end housing portion are configured to interface at a mating surface of the respective housing portions and define a volume, and wherein the end housing includes a sensor cavity extending into the volume toward the inlet housing.

Example 18: A compressor housing according to Example 17, wherein the compressor housing also comprises a compressor housing according to any one of Examples 1 through 16.

Example 19: A compressor housing of a centrifugal compressor, the compressor housing comprising: a main housing portion configured to house a compressor motor and an inlet housing, wherein the inlet housing is configured to receive vapor refrigerant downstream of the compressor motor; and an end housing portion, wherein the main housing portion and the end housing portion are configured to interface at a mating surface of the respective housing portions and define a volume, and wherein the compressor housing includes a sensor port configured to house a sensor.

Example 20: A compressor housing according to Example 19, wherein the sensor port includes one or more of a sensor cavity or a sensor mount.

Example 21: A compressor housing according to any of Examples 19 or 20, wherein the sensor port is configured to house a temperature sensor and/or a pressure sensor and/or a vapor flow rate sensor.

Example 22: A compressor housing according to any of Examples 19 through 21, wherein the sensor port is located on an inside of the compressor housing.

Example 23: A compressor housing according to any of Examples 19 through 22, wherein the end housing portion includes the sensor port.

Example 24: A compressor housing according to Example 23, wherein the sensor port is configured to extend into the volume toward the main housing portion.

Example 25: A compressor housing according to any of Examples 19 through 24, wherein the compressor housing and/or centrifugal compressor also comprises a compressor housing and/or centrifugal compressor according to any one of Examples 1 through 18.

Example 26: A vapor-cooling system comprising: a condenser configured to condense a refrigerant using air from an environment, wherein the refrigerant has a vapor density at 25° C. of less than about 15 kg/m$^3$, is non-ozone depleting, non-toxic, non-flammable, and has an ultra-low global warming potential (GWP); an evaporator configured to remove heat from a supply air stream using the refrigerant and discharge vapor refrigerant; and a centrifugal compressor configured to increase the pressure of the refrigerant, wherein the vapor-compression system has a cooling capacity of less than 35 kilowatts (kW).

Example 27: A vapor-cooling system according to Example 26, wherein the vapor-cooling system also comprises a compressor and/or compressor housing according to any one of Examples 1 through 25.

Example 28: A compressor housing of a centrifugal compressor, the compressor housing includes a main housing portion configured to house a compressor motor and an inlet housing, wherein the inlet housing is configured to receive vapor refrigerant downstream of the compressor motor; and an end housing portion, wherein the main housing portion and the end housing portion are configured to interface at a mating surface of the respective housing portions and define a volume, and wherein the end housing portion includes a sensor cavity extending into the volume toward an opening of the inlet housing.

Example 29: The compressor housing of example 28, wherein the sensor cavity is defined by a sensor cavity wall comprising an inner surface external to the volume and an external surface in fluid communication with the volume.

Example 30: The compressor housing of example 29, wherein sensor cavity is configured to removably affix a temperature sensor at least partially within the sensor cavity and external to the volume.

Example 31: The compressor housing of example 30, wherein the sensor is one of a thermistor, a thermocouple, or a resistance temperature detector.

Example 32: The compressor housing of any of examples 30 and 31, wherein the sensor cavity is configured to allow the temperature sensor to be removed while maintaining a hermetic seal between the main housing portion and the end housing portion.

Example 33: The compressor housing of any of examples 30 through 32, wherein the sensor cavity is configured to position the temperature sensor within a volume nearer to the opening of the inlet housing than to an inner surface of the end housing.

Example 34: The compressor housing of example 33, wherein the sensor cavity is configured to form a hermetic seal with the end housing.

Example 35: The compressor housing of example 34, wherein the end housing comprises a dome shape.

Example 36: The compressor housing of any of examples 28 through 35, wherein the end housing comprises at least one structure configured to guide vapor refrigerant toward the inlet housing.

Example 37: A method of controlling a superheat of a centrifugal compressor includes measuring a temperature of a vapor refrigerant at an opening to an inlet housing, wherein the inlet housing is configured to receive vapor refrigerant downstream of a compressor motor; determining that the measured temperature of the vapor refrigerant is less than a temperature threshold value; and changing a mass flow rate of the vapor refrigerant within the compressor in response to determining that the measured temperature of the vapor refrigerant is less than the temperature threshold value.

Example 38: The method of example 37, wherein changing the mass flow rate of the vapor refrigerant within the compressor comprises one of opening and closing an expansion valve.

Example 39: The method of example 38, wherein changing the mass flow rate comprises reducing the mass flow rate of the vapor refrigerant in response to determining that the temperature of the vapor refrigerant is less than the temperature threshold value.

Example 40: The method of example 39, wherein the temperature threshold value is at least eight degrees Celsius above a saturation temperature of the vapor refrigerant.

Example 41: A centrifugal compressor end housing includes an end housing wall; and at least one mating surface configured to interface at a mating surface of a main housing portion, the main housing portion configured to house an inlet housing, wherein the inlet housing is configured to receive vapor refrigerant downstream of a compressor motor; wherein the main housing portion and the end housing wall define a volume, and wherein the end housing wall includes a sensor cavity configured to extend into the volume toward an opening of the inlet housing.

Example 42: The centrifugal compressor end housing of example 41, wherein the sensor cavity is defined by a sensor cavity wall comprising an inner surface external to the volume and an external surface in fluid communication with the volume.

Example 43: The centrifugal compressor end housing of example 42, wherein sensor cavity is configured to removably affix a temperature sensor at least partially within the sensor cavity and external to the volume.

Example 44: The centrifugal compressor end housing of example 43, wherein the sensor cavity is configured to allow the temperature sensor to be removed while maintaining a hermetic seal between the main housing portion and the end housing portion.

Example 45: The centrifugal compressor end housing of any of examples 43 and 44, wherein the sensor cavity is configured to position the temperature sensor within a volume nearer to the opening of the inlet housing than to an inner surface of the end housing wall.

Example 46: The centrifugal compressor end housing of example 45, wherein the sensor cavity is configured to form a hermetic seal with the end housing.

Example 47: The centrifugal compressor end housing of any of examples 41 through 46, wherein the centrifugal compressor end housing comprises a dome shape.

Various examples have been described. These and other examples are within the scope of the following claims.

What is claimed is:

1. A compressor housing of a centrifugal compressor, the compressor housing comprising:
    a main housing portion configured to house a compressor motor and an inlet housing, wherein the inlet housing is configured to receive vapor refrigerant downstream of the compressor motor; and
    an end housing portion,
    wherein the main housing portion and the end housing portion are configured to interface at a mating surface of the respective housing portions and define a volume, and
    wherein the end housing portion includes a sensor cavity extending into the volume toward an opening of the inlet housing,
    wherein the sensor cavity is defined by a sensor cavity wall separating the sensor cavity from the volume and comprising an inner surface external to the volume and an external surface in fluid communication with the volume.

2. The compressor housing of claim 1, wherein sensor cavity is configured to removably affix a temperature sensor at least partially within the sensor cavity and external to the volume.

3. The compressor housing of claim 2, wherein the sensor is one of a thermistor, a thermocouple, or a resistance temperature detector.

4. The compressor housing of claim 2, wherein the sensor cavity is configured to allow the temperature sensor to be removed while maintaining a hermetic seal between the main housing portion and the end housing portion.

5. The compressor housing of claim 2, wherein the sensor cavity is configured to position the temperature sensor within a volume nearer to the opening of the inlet housing than to an inner surface of the end housing.

6. The compressor housing of claim 5, wherein the sensor cavity is configured to form a hermetic seal with the end housing.

7. The compressor housing of claim 6, wherein the end housing comprises a dome shape.

8. The compressor housing of claim 1, wherein the end housing comprises at least one structure configured to guide vapor refrigerant toward the inlet housing.

9. A centrifugal compressor end housing comprising:
an end housing wall; and
at least one mating surface configured to interface at a mating surface of a main housing portion, the main housing portion configured to house an inlet housing, wherein the inlet housing is configured to receive vapor refrigerant downstream of a compressor motor;
wherein the main housing portion and the end housing wall define a volume, and
wherein the end housing wall includes a sensor cavity configured to extend into the volume toward an opening of the inlet housing,
wherein the sensor cavity is defined by a sensor cavity wall separating the sensor cavity from the volume and comprising an inner surface external to the volume and an external surface in fluid communication with the volume.

10. The centrifugal compressor end housing of claim 9, wherein sensor cavity is configured to removably affix a temperature sensor at least partially within the sensor cavity and external to the volume.

11. The centrifugal compressor end housing of claim 10, wherein the sensor cavity is configured to allow the temperature sensor to be removed while maintaining a hermetic seal between the main housing portion and the end housing portion.

12. The centrifugal compressor end housing of claim 10, wherein the sensor cavity is configured to position the temperature sensor within a volume nearer to the opening of the inlet housing than to an inner surface of the end housing wall.

13. The centrifugal compressor end housing of claim 12, wherein the sensor cavity is configured to form a hermetic seal with the end housing.

14. The centrifugal compressor end housing of claim 9, wherein the centrifugal compressor end housing comprises a dome shape.

* * * * *